US011323443B2

(12) United States Patent
Kang et al.

(10) Patent No.: US 11,323,443 B2
(45) Date of Patent: May 3, 2022

(54) ACCESS IDENTIFIER PROVISIONING TO APPLICATION

(71) Applicant: Visa International Service Association, San Francisco, CA (US)

(72) Inventors: Dong Soon Denis Kang, Seoul (KR); Francois Hribovsek, Singapore (SG); Swapnil Vasant Mhasde, Singapore (SG); Guan Heng Christophe Yeo, Singapore (SG)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 418 days.

(21) Appl. No.: 16/347,175

(22) PCT Filed: Nov. 28, 2017

(86) PCT No.: PCT/US2017/063514
§ 371 (c)(1),
(2) Date: May 2, 2019

(87) PCT Pub. No.: WO2018/098492
PCT Pub. Date: May 31, 2018

(65) Prior Publication Data
US 2020/0267153 A1      Aug. 20, 2020

Related U.S. Application Data

(60) Provisional application No. 62/427,046, filed on Nov. 28, 2016.

(51) Int. Cl.
*H04L 9/40*      (2022.01)
*G06F 21/62*     (2013.01)
(Continued)

(52) U.S. Cl.
CPC .............. *H04L 63/10* (2013.01); *G06F 21/62* (2013.01); *H04W 12/35* (2021.01); *G06Q 20/385* (2013.01)

(58) Field of Classification Search
CPC ... H04L 63/10; H04L 2209/42; H04L 9/3213; H04W 12/35; G06F 21/62; G06F 21/335; G06Q 20/385
See application file for complete search history.

(56) References Cited

U.S. PATENT DOCUMENTS

| 5,280,527 A | 1/1994 | Gullman |
| 5,613,012 A | 3/1997 | Hoffman |

(Continued)

FOREIGN PATENT DOCUMENTS

| EP | 1028401 A2 | 8/2000 |
| EP | 2156397 A1 | 2/2010 |

(Continued)

OTHER PUBLICATIONS

Petition for Inter Partes Review of U.S. Pat. No. 8,533,860 Challenging Claims 1-30 Under 35 U.S.C. § 312 and 37 C.F.R. § 42.104, filed Feb. 17, 2016, Before the USPTO Patent Trial and Appeal Board, IPR 2016-00600, 65 pages.

(Continued)

*Primary Examiner* — Abiy Getachew
(74) *Attorney, Agent, or Firm* — Kilpatrick Townsend & Stockton LLP

(57) ABSTRACT

Methods and systems for performing on demand access transactions are disclosed. In one example, the method includes receiving, by a directory service computer from an authorizing computer, a file including a primary access identifiers and virtual access identifiers, the virtual access identifiers not being capable of being used at resource providers to conduct transactions. The method also includes (Continued)

receiving a request to provide an access token that is associated with an account, the request comprising information that identifies the account. The method further includes retrieving a virtual access identifier based on the identifying information; and requesting, by the directory service computer to a token service computer, that the access token be provisioned on the user device or an application computer associated with an application on the user device.

18 Claims, 5 Drawing Sheets

(51) Int. Cl.
    *H04W 12/30*     (2021.01)
    *G06Q 20/38*     (2012.01)
    *H04L 29/06*     (2006.01)

(56) References Cited

U.S. PATENT DOCUMENTS

| | | |
|---|---|---|
| 5,781,438 A | 7/1998 | Lee |
| 5,883,810 A | 3/1999 | Franklin |
| 5,930,767 A | 7/1999 | Reber |
| 5,953,710 A | 9/1999 | Fleming |
| 5,956,699 A | 9/1999 | Wong |
| 6,000,832 A | 12/1999 | Franklin |
| 6,014,635 A | 1/2000 | Harris |
| 6,044,360 A | 3/2000 | Picciallo |
| 6,163,771 A | 12/2000 | Walker |
| 6,227,447 B1 | 5/2001 | Campisano |
| 6,236,981 B1 | 5/2001 | Hill |
| 6,267,292 B1 | 7/2001 | Walker |
| 6,327,578 B1 | 12/2001 | Linehan |
| 6,341,724 B2 | 1/2002 | Campisano |
| 6,385,596 B1 | 5/2002 | Wiser |
| 6,422,462 B1 | 7/2002 | Cohen |
| 6,425,523 B1 | 7/2002 | Shem Ur |
| 6,453,301 B1 | 9/2002 | Niwa |
| 6,592,044 B1 | 7/2003 | Wong |
| 6,636,833 B1 | 10/2003 | Flitcroft |
| 6,748,367 B1 | 6/2004 | Lee |
| 6,805,287 B2 | 10/2004 | Bishop |
| 6,879,965 B2 | 4/2005 | Fung |
| 6,891,953 B1 | 5/2005 | DeMello |
| 6,901,387 B2 | 5/2005 | Wells |
| 6,931,382 B2 | 8/2005 | Laage |
| 6,938,019 B1 | 8/2005 | Uzo |
| 6,941,285 B2 | 9/2005 | Sarcanin |
| 6,980,670 B1 | 12/2005 | Hoffman |
| 6,990,470 B2 | 1/2006 | Hogan |
| 6,991,157 B2 | 1/2006 | Bishop |
| 7,051,929 B2 | 5/2006 | Li |
| 7,069,249 B2 | 6/2006 | Stolfo |
| 7,103,576 B2 | 9/2006 | Mann, III |
| 7,113,930 B2 | 9/2006 | Eccles |
| 7,136,835 B1 | 11/2006 | Flitcroft |
| 7,177,835 B1 | 2/2007 | Walker |
| 7,177,848 B2 | 2/2007 | Hogan |
| 7,194,437 B1 | 3/2007 | Britto |
| 7,209,561 B1 | 4/2007 | Shankar et al. |
| 7,264,154 B2 | 9/2007 | Harris |
| 7,287,692 B1 | 10/2007 | Patel |
| 7,292,999 B2 | 11/2007 | Hobson |
| 7,350,230 B2 | 3/2008 | Forrest |
| 7,353,382 B2 | 4/2008 | Labrou |
| 7,379,919 B2 | 5/2008 | Hogan |
| RE40,444 E | 7/2008 | Linehan |
| 7,415,443 B2 | 8/2008 | Hobson |
| 7,444,676 B1 | 10/2008 | Asghari-Kamrani |
| 7,469,151 B2 | 12/2008 | Khan |
| 7,548,889 B2 | 6/2009 | Bhambri |
| 7,567,934 B2 | 7/2009 | Flitcroft |
| 7,567,936 B1 | 7/2009 | Peckover |
| 7,571,139 B1 | 8/2009 | Giordano |
| 7,571,142 B1 | 8/2009 | Flitcroft |
| 7,580,898 B2 | 8/2009 | Brown |
| 7,584,153 B2 | 9/2009 | Brown |
| 7,593,896 B1 | 9/2009 | Flitcroft |
| 7,606,560 B2 | 10/2009 | Labrou |
| 7,627,531 B2 | 12/2009 | Breck |
| 7,627,895 B2 | 12/2009 | Gifford |
| 7,650,314 B1 | 1/2010 | Saunders |
| 7,685,037 B2 | 3/2010 | Reiners |
| 7,702,578 B2 | 4/2010 | Fung |
| 7,707,120 B2 | 4/2010 | Dominguez |
| 7,712,655 B2 | 5/2010 | Wong |
| 7,734,527 B2 | 6/2010 | Uzo |
| 7,753,265 B2 | 7/2010 | Harris |
| 7,770,789 B2 | 8/2010 | Oder, II |
| 7,784,685 B1 | 8/2010 | Hopkins, III |
| 7,793,851 B2 | 9/2010 | Mullen |
| 7,801,826 B2 | 9/2010 | Labrou |
| 7,805,376 B2 | 9/2010 | Smith |
| 7,805,378 B2 | 9/2010 | Berardi |
| 7,818,264 B2 | 10/2010 | Hammad |
| 7,828,220 B2 | 11/2010 | Mullen |
| 7,835,960 B2 | 11/2010 | Breck |
| 7,841,523 B2 | 11/2010 | Oder, II |
| 7,841,539 B2 | 11/2010 | Hewton |
| 7,844,550 B2 | 11/2010 | Walker |
| 7,848,980 B2 | 12/2010 | Carlson |
| 7,849,020 B2 | 12/2010 | Johnson |
| 7,853,529 B1 | 12/2010 | Walker |
| 7,853,995 B2 | 12/2010 | Chow |
| 7,865,414 B2 | 1/2011 | Fung |
| 7,873,579 B2 | 1/2011 | Hobson |
| 7,873,580 B2 | 1/2011 | Hobson |
| 7,890,393 B2 | 2/2011 | Talbert |
| 7,891,563 B2 | 2/2011 | Oder, II |
| 7,896,238 B2 | 3/2011 | Fein |
| 7,908,216 B1 | 3/2011 | Davis et al. |
| 7,922,082 B2 | 4/2011 | Muscato |
| 7,931,195 B2 | 4/2011 | Mullen |
| 7,937,324 B2 | 5/2011 | Patterson |
| 7,938,318 B2 | 5/2011 | Fein |
| 7,954,705 B2 | 6/2011 | Mullen |
| 7,959,076 B1 | 6/2011 | Hopkins, III |
| 7,996,288 B1 | 8/2011 | Stolfo |
| 8,025,223 B2 | 9/2011 | Saunders |
| 8,046,256 B2 | 10/2011 | Chien |
| 8,060,448 B2 | 11/2011 | Jones |
| 8,060,449 B1 | 11/2011 | Zhu |
| 8,074,877 B2 | 12/2011 | Mullen |
| 8,074,879 B2 | 12/2011 | Harris |
| 8,082,210 B2 | 12/2011 | Hansen |
| 8,095,113 B2 | 1/2012 | Kean |
| 8,104,679 B2 | 1/2012 | Brown |
| RE43,157 E | 2/2012 | Bishop |
| 8,109,436 B1 | 2/2012 | Hopkins, III |
| 8,121,942 B2 | 2/2012 | Carlson |
| 8,121,956 B2 | 2/2012 | Carlson |
| 8,126,449 B2 | 2/2012 | Beenau |
| 8,132,723 B2 | 3/2012 | Hogg et al. |
| 8,171,525 B1 | 5/2012 | Pelly |
| 8,175,973 B2 | 5/2012 | Davis et al. |
| 8,190,523 B2 | 5/2012 | Patterson |
| 8,196,813 B2 | 6/2012 | Vadhri |
| 8,205,791 B2 | 6/2012 | Randazza |
| 8,219,489 B2 | 7/2012 | Patterson |
| 8,224,702 B2 | 7/2012 | Mengerink |
| 8,225,385 B2 | 7/2012 | Chow |
| 8,229,852 B2 | 7/2012 | Carlson |
| 8,265,993 B2 | 9/2012 | Chien |
| 8,280,777 B2 | 10/2012 | Mengerink |
| 8,281,991 B2 | 10/2012 | Wentker et al. |
| 8,328,095 B2 | 12/2012 | Oder, II |
| 8,336,088 B2 | 12/2012 | Raj et al. |
| 8,346,666 B2 | 1/2013 | Lindelsee et al. |
| 8,376,225 B1 | 2/2013 | Hopkins, III |
| 8,380,177 B2 | 2/2013 | Laracey |
| 8,387,873 B2 | 3/2013 | Saunders |
| 8,401,539 B2 | 3/2013 | Beenau |

(56) References Cited

U.S. PATENT DOCUMENTS

| | | |
|---|---|---|
| 8,401,898 B2 | 3/2013 | Chien |
| 8,402,555 B2 | 3/2013 | Grecia |
| 8,403,211 B2 | 3/2013 | Brooks |
| 8,412,623 B2 | 4/2013 | Moon |
| 8,412,837 B1 | 4/2013 | Emigh |
| 8,417,642 B2 | 4/2013 | Oren |
| 8,447,699 B2 | 5/2013 | Batada |
| 8,453,223 B2 | 5/2013 | Svigals |
| 8,453,925 B2 | 6/2013 | Fisher |
| 8,458,487 B1 | 6/2013 | Palgon |
| 8,484,134 B2 | 7/2013 | Hobson |
| 8,485,437 B2 | 7/2013 | Mullen |
| 8,494,959 B2 | 7/2013 | Hathaway |
| 8,498,908 B2 | 7/2013 | Mengerink |
| 8,504,475 B2 | 8/2013 | Brand et al. |
| 8,504,478 B2 | 8/2013 | Saunders |
| 8,510,816 B2 | 8/2013 | Quach |
| 8,433,116 B2 | 9/2013 | Davis et al. |
| 8,528,067 B2 | 9/2013 | Hurry et al. |
| 8,533,860 B1 | 9/2013 | Grecia |
| 8,538,845 B2 | 9/2013 | Liberty |
| 8,555,079 B2 | 10/2013 | Shablygin |
| 8,566,168 B1 | 10/2013 | Bierbaum |
| 8,567,670 B2 | 10/2013 | Stanfield |
| 8,571,939 B2 | 10/2013 | Lindsey |
| 8,577,336 B2 | 11/2013 | Mechaley, Jr. |
| 8,577,803 B2 | 11/2013 | Chatterjee |
| 8,577,813 B2 | 11/2013 | Weiss |
| 8,578,176 B2 | 11/2013 | Mattsson |
| 8,583,494 B2 | 11/2013 | Fisher |
| 8,584,251 B2 | 11/2013 | Mcguire |
| 8,589,237 B2 | 11/2013 | Fisher |
| 8,589,271 B2 | 11/2013 | Evans |
| 8,589,291 B2 | 11/2013 | Carlson |
| 8,595,098 B2 | 11/2013 | Starai |
| 8,595,812 B2 | 11/2013 | Bomar |
| 8,595,850 B2 | 11/2013 | Spies |
| 8,606,638 B2 | 12/2013 | Dragt |
| 8,606,700 B2 | 12/2013 | Carlson |
| 8,606,720 B1 | 12/2013 | Baker |
| 8,615,468 B2 | 12/2013 | Varadarajan |
| 8,620,754 B2 | 12/2013 | Fisher |
| 8,635,157 B2 | 1/2014 | Smith |
| 8,646,059 B1 | 2/2014 | Von Behren |
| 8,651,374 B2 | 2/2014 | Brabson |
| 8,656,180 B2 | 2/2014 | Shablygin |
| 8,751,391 B2 | 6/2014 | Freund |
| 8,751,642 B2 | 6/2014 | Vargas |
| 8,762,263 B2 | 6/2014 | Gauthier et al. |
| 8,793,186 B2 | 7/2014 | Patterson |
| 8,838,982 B2 | 9/2014 | Carlson et al. |
| 8,856,539 B2 | 10/2014 | Weiss |
| 8,887,308 B2 | 11/2014 | Grecia |
| 9,065,643 B2 | 6/2015 | Hurry et al. |
| 9,070,129 B2 | 6/2015 | Sheets et al. |
| 9,100,826 B2 | 8/2015 | Weiss |
| 9,160,741 B2 | 10/2015 | Wentker et al. |
| 9,229,964 B2 | 1/2016 | Stevelinck |
| 9,245,267 B2 | 1/2016 | Singh |
| 9,249,241 B2 | 2/2016 | Dai et al. |
| 9,256,871 B2 | 2/2016 | Anderson et al. |
| 9,280,765 B2 | 3/2016 | Hammad |
| 9,530,137 B2 | 12/2016 | Weiss |
| 9,646,303 B2 | 5/2017 | Karpenko |
| 9,680,942 B2 | 6/2017 | Dimmick |
| 2001/0029485 A1 | 10/2001 | Brody |
| 2001/0034720 A1 | 10/2001 | Armes |
| 2001/0054003 A1 | 12/2001 | Chien |
| 2002/0007320 A1 | 1/2002 | Hogan |
| 2002/0016749 A1 | 2/2002 | Borecki |
| 2002/0029193 A1 | 3/2002 | Ranjan |
| 2002/0035548 A1 | 3/2002 | Hogan |
| 2002/0073045 A1 | 6/2002 | Rubin |
| 2002/0116341 A1 | 8/2002 | Hogan |
| 2002/0133467 A1 | 9/2002 | Hobson |
| 2002/0147913 A1 | 10/2002 | Lun Yip |
| 2003/0028481 A1 | 2/2003 | Flitcroft |
| 2003/0130955 A1 | 7/2003 | Hawthorne |
| 2003/0191709 A1 | 10/2003 | Elston |
| 2003/0191945 A1 | 10/2003 | Keech |
| 2004/0010462 A1 | 1/2004 | Moon |
| 2004/0050928 A1 | 3/2004 | Bishop |
| 2004/0059682 A1 | 3/2004 | Hasumi |
| 2004/0093281 A1 | 5/2004 | Silverstein |
| 2004/0139008 A1 | 7/2004 | Mascavage |
| 2004/0143532 A1 | 7/2004 | Lee |
| 2004/0158532 A1 | 8/2004 | Breck |
| 2004/0210449 A1 | 10/2004 | Breck |
| 2004/0210498 A1 | 10/2004 | Freund |
| 2004/0232225 A1 | 11/2004 | Bishop |
| 2004/0236632 A1 | 11/2004 | Maritzen |
| 2004/0260646 A1 | 12/2004 | Berardi |
| 2005/0037735 A1 | 2/2005 | Coutts |
| 2005/0080730 A1 | 4/2005 | Sorrentino |
| 2005/0108178 A1 | 5/2005 | York |
| 2005/0199709 A1 | 9/2005 | Linlor |
| 2005/0246293 A1 | 11/2005 | Ong |
| 2005/0269401 A1 | 12/2005 | Spitzer |
| 2005/0269402 A1 | 12/2005 | Spitzer |
| 2006/0235795 A1 | 10/2006 | Johnson |
| 2006/0237528 A1 | 10/2006 | Bishop |
| 2006/0278704 A1 | 12/2006 | Saunders |
| 2007/0107044 A1 | 5/2007 | Yuen |
| 2007/0129955 A1 | 6/2007 | Dalmia |
| 2007/0136193 A1 | 6/2007 | Starr |
| 2007/0136211 A1 | 6/2007 | Brown |
| 2007/0170247 A1 | 7/2007 | Friedman |
| 2007/0179885 A1 | 8/2007 | Bird |
| 2007/0208671 A1 | 9/2007 | Brown |
| 2007/0245414 A1 | 10/2007 | Chan |
| 2007/0288377 A1 | 12/2007 | Shaked |
| 2007/0291995 A1 | 12/2007 | Rivera |
| 2008/0015988 A1 | 1/2008 | Brown |
| 2008/0029607 A1 | 2/2008 | Mullen |
| 2008/0035738 A1 | 2/2008 | Mullen |
| 2008/0052226 A1 | 2/2008 | Agarwal |
| 2008/0054068 A1 | 3/2008 | Mullen |
| 2008/0054079 A1 | 3/2008 | Mullen |
| 2008/0054081 A1 | 3/2008 | Mullen |
| 2008/0065554 A1 | 3/2008 | Hogan |
| 2008/0065555 A1 | 3/2008 | Mullen |
| 2008/0201264 A1 | 8/2008 | Brown |
| 2008/0201265 A1 | 8/2008 | Hewton |
| 2008/0228646 A1 | 9/2008 | Myers |
| 2008/0243702 A1 | 10/2008 | Hart |
| 2008/0245855 A1 | 10/2008 | Fein |
| 2008/0245861 A1 | 10/2008 | Fein |
| 2008/0283591 A1 | 11/2008 | Oder, II |
| 2008/0302869 A1 | 12/2008 | Mullen |
| 2008/0302876 A1 | 12/2008 | Mullen |
| 2008/0313264 A1 | 12/2008 | Pestoni |
| 2009/0006262 A1 | 1/2009 | Brown |
| 2009/0010488 A1 | 1/2009 | Matsuoka |
| 2009/0037333 A1 | 2/2009 | Flitcroft |
| 2009/0037388 A1 | 2/2009 | Cooper |
| 2009/0043702 A1 | 2/2009 | Bennett |
| 2009/0048971 A1 | 2/2009 | Hathaway |
| 2009/0106112 A1 | 4/2009 | Dalmia |
| 2009/0106160 A1 | 4/2009 | Skowronek |
| 2009/0134217 A1 | 5/2009 | Flitcroft |
| 2009/0157555 A1 | 6/2009 | Biffle |
| 2009/0159673 A1 | 6/2009 | Mullen |
| 2009/0159700 A1 | 6/2009 | Mullen |
| 2009/0159707 A1 | 6/2009 | Mullen |
| 2009/0173782 A1 | 7/2009 | Muscato |
| 2009/0200371 A1 | 8/2009 | Kean |
| 2009/0248583 A1 | 10/2009 | Chhabra |
| 2009/0276347 A1 | 11/2009 | Kargman |
| 2009/0281948 A1 | 11/2009 | Carlson |
| 2009/0294527 A1 | 12/2009 | Brabson |
| 2009/0307139 A1 | 12/2009 | Mardikar |
| 2009/0308921 A1 | 12/2009 | Mullen |
| 2009/0327131 A1 | 12/2009 | Beenau |
| 2010/0008535 A1 | 1/2010 | Abulafia |

(56) References Cited

U.S. PATENT DOCUMENTS

| | | |
|---|---|---|
| 2010/0088237 A1 | 4/2010 | Wankmueller |
| 2010/0094755 A1 | 4/2010 | Kloster |
| 2010/0106644 A1 | 4/2010 | Annan |
| 2010/0120408 A1 | 5/2010 | Beenau |
| 2010/0133334 A1 | 6/2010 | Vadhri |
| 2010/0138347 A1 | 6/2010 | Chen |
| 2010/0145860 A1 | 6/2010 | Pelegero |
| 2010/0161433 A1 | 6/2010 | White |
| 2010/0185545 A1 | 7/2010 | Royyuru |
| 2010/0211505 A1 | 8/2010 | Saunders |
| 2010/0223186 A1 | 9/2010 | Hogan |
| 2010/0228668 A1 | 9/2010 | Hogan |
| 2010/0235284 A1 | 9/2010 | Moore |
| 2010/0258620 A1 | 10/2010 | Torreyson |
| 2010/0291904 A1 | 11/2010 | Musfeldt |
| 2010/0299267 A1 | 11/2010 | Faith et al. |
| 2010/0306076 A1 | 12/2010 | Taveau |
| 2010/0325041 A1 | 12/2010 | Berardi |
| 2011/0010292 A1 | 1/2011 | Giordano |
| 2011/0016047 A1 | 1/2011 | Wu |
| 2011/0016320 A1 | 1/2011 | Bergsten |
| 2011/0040640 A1 | 2/2011 | Erikson |
| 2011/0047076 A1 | 2/2011 | Carlson et al. |
| 2011/0083018 A1 | 4/2011 | Kesanupalli |
| 2011/0087596 A1 | 4/2011 | Dorsey |
| 2011/0093397 A1 | 4/2011 | Carlson |
| 2011/0125597 A1 | 5/2011 | Oder, II |
| 2011/0153437 A1 | 6/2011 | Archer |
| 2011/0153498 A1 | 6/2011 | Makhotin et al. |
| 2011/0154466 A1 | 6/2011 | Harper |
| 2011/0161233 A1 | 6/2011 | Tieken |
| 2011/0178926 A1 | 7/2011 | Lindelsee et al. |
| 2011/0191244 A1 | 8/2011 | Dai |
| 2011/0238511 A1 | 9/2011 | Park |
| 2011/0238573 A1 | 9/2011 | Varadarajan |
| 2011/0246317 A1 | 10/2011 | Coppinger |
| 2011/0258111 A1 | 10/2011 | Raj et al. |
| 2011/0272471 A1 | 11/2011 | Mullen |
| 2011/0272478 A1 | 11/2011 | Mullen |
| 2011/0276380 A1 | 11/2011 | Mullen |
| 2011/0276381 A1 | 11/2011 | Mullen |
| 2011/0276424 A1 | 11/2011 | Mullen |
| 2011/0276425 A1 | 11/2011 | Mullen |
| 2011/0295745 A1 | 12/2011 | White |
| 2011/0302081 A1 | 12/2011 | Saunders |
| 2012/0023567 A1 | 1/2012 | Hammad |
| 2012/0028609 A1 | 2/2012 | Hruska |
| 2012/0030047 A1 | 2/2012 | Fuentes et al. |
| 2012/0035998 A1 | 2/2012 | Chien |
| 2012/0041881 A1 | 2/2012 | Basu |
| 2012/0047237 A1 | 2/2012 | Arvidsson |
| 2012/0066078 A1 | 3/2012 | Kingston |
| 2012/0072350 A1 | 3/2012 | Goldthwaite |
| 2012/0078735 A1 | 3/2012 | Bauer |
| 2012/0078798 A1 | 3/2012 | Downing |
| 2012/0078799 A1 | 3/2012 | Jackson |
| 2012/0095852 A1 | 4/2012 | Bauer |
| 2012/0095865 A1 | 4/2012 | Doherty |
| 2012/0116902 A1 | 5/2012 | Cardina |
| 2012/0123882 A1 | 5/2012 | Carlson |
| 2012/0123940 A1 | 5/2012 | Killian |
| 2012/0129514 A1 | 5/2012 | Beenau |
| 2012/0143754 A1 | 6/2012 | Patel |
| 2012/0143761 A1* | 6/2012 | Doran .................... G06Q 20/40 705/44 |
| 2012/0143767 A1 | 6/2012 | Abadir |
| 2012/0143772 A1 | 6/2012 | Abadir |
| 2012/0158580 A1 | 6/2012 | Eram |
| 2012/0158593 A1 | 6/2012 | Garfinkle |
| 2012/0173431 A1 | 7/2012 | Ritchie |
| 2012/0185386 A1 | 7/2012 | Salama |
| 2012/0197807 A1 | 8/2012 | Schlesser |
| 2012/0203664 A1 | 8/2012 | Torossian |
| 2012/0203666 A1 | 8/2012 | Torossian |
| 2012/0215688 A1 | 8/2012 | Musser |
| 2012/0215696 A1 | 8/2012 | Salonen |
| 2012/0221421 A1 | 8/2012 | Hammad |
| 2012/0226582 A1 | 9/2012 | Hammad |
| 2012/0231844 A1 | 9/2012 | Coppinger |
| 2012/0233004 A1 | 9/2012 | Bercaw |
| 2012/0246070 A1 | 9/2012 | Vadhri |
| 2012/0246071 A1 | 9/2012 | Jain |
| 2012/0246079 A1 | 9/2012 | Wilson et al. |
| 2012/0265631 A1 | 10/2012 | Cronic |
| 2012/0271770 A1 | 10/2012 | Harris |
| 2012/0297446 A1 | 11/2012 | Webb |
| 2012/0300932 A1 | 11/2012 | Cambridge |
| 2012/0303503 A1 | 11/2012 | Cambridge |
| 2012/0303961 A1 | 11/2012 | Kean |
| 2012/0304273 A1 | 11/2012 | Bailey |
| 2012/0310725 A1 | 12/2012 | Chien |
| 2012/0310831 A1 | 12/2012 | Harris |
| 2012/0316992 A1 | 12/2012 | Oborne |
| 2012/0317035 A1 | 12/2012 | Royyuru |
| 2012/0317036 A1 | 12/2012 | Bower |
| 2013/0017784 A1 | 1/2013 | Fisher |
| 2013/0018757 A1 | 1/2013 | Anderson et al. |
| 2013/0019098 A1 | 1/2013 | Gupta |
| 2013/0031006 A1 | 1/2013 | Mccullagh et al. |
| 2013/0054337 A1 | 2/2013 | Brendell |
| 2013/0054466 A1 | 2/2013 | Muscato |
| 2013/0054474 A1 | 2/2013 | Yeager |
| 2013/0081122 A1 | 3/2013 | Svigals |
| 2013/0091028 A1 | 4/2013 | Oder, II |
| 2013/0110658 A1 | 5/2013 | Lyman |
| 2013/0111599 A1 | 5/2013 | Gargiulo |
| 2013/0117185 A1 | 5/2013 | Collison |
| 2013/0124290 A1 | 5/2013 | Fisher |
| 2013/0124291 A1 | 5/2013 | Fisher |
| 2013/0124364 A1 | 5/2013 | Mittal |
| 2013/0138525 A1 | 5/2013 | Bercaw |
| 2013/0144888 A1 | 6/2013 | Faith |
| 2013/0145148 A1 | 6/2013 | Shablygin |
| 2013/0145172 A1 | 6/2013 | Shablygin |
| 2013/0159178 A1 | 6/2013 | Colon |
| 2013/0159184 A1 | 6/2013 | Thaw |
| 2013/0166402 A1 | 6/2013 | Parento |
| 2013/0166456 A1 | 6/2013 | Zhang |
| 2013/0173736 A1 | 7/2013 | Krzeminski |
| 2013/0185202 A1 | 7/2013 | Goldthwaite |
| 2013/0191227 A1 | 7/2013 | Pasa et al. |
| 2013/0191286 A1 | 7/2013 | Cronic |
| 2013/0191289 A1 | 7/2013 | Cronic |
| 2013/0198071 A1 | 8/2013 | Jurss |
| 2013/0198080 A1 | 8/2013 | Anderson et al. |
| 2013/0200146 A1 | 8/2013 | Moghadam |
| 2013/0204787 A1 | 8/2013 | Dubois |
| 2013/0204793 A1 | 8/2013 | Kerridge |
| 2013/0212007 A1 | 8/2013 | Mattsson |
| 2013/0212017 A1 | 8/2013 | Bangia |
| 2013/0212019 A1 | 8/2013 | Mattsson |
| 2013/0212024 A1 | 8/2013 | Mattsson |
| 2013/0212026 A1 | 8/2013 | Powell et al. |
| 2013/0212666 A1 | 8/2013 | Mattsson |
| 2013/0218698 A1 | 8/2013 | Moon |
| 2013/0218769 A1 | 8/2013 | Pourfallah et al. |
| 2013/0226799 A1 | 8/2013 | Raj |
| 2013/0226802 A1 | 8/2013 | Hammad |
| 2013/0226813 A1 | 8/2013 | Voltz |
| 2013/0246199 A1 | 9/2013 | Carlson |
| 2013/0246202 A1 | 9/2013 | Tobin |
| 2013/0246203 A1 | 9/2013 | Laracey |
| 2013/0246258 A1 | 9/2013 | Dessert |
| 2013/0246259 A1 | 9/2013 | Dessert |
| 2013/0246261 A1 | 9/2013 | Purves et al. |
| 2013/0246267 A1 | 9/2013 | Tobin |
| 2013/0254028 A1 | 9/2013 | Salci |
| 2013/0254052 A1 | 9/2013 | Royyuru |
| 2013/0254102 A1 | 9/2013 | Royyuru |
| 2013/0254117 A1 | 9/2013 | Von Mueller |
| 2013/0262296 A1 | 10/2013 | Thomas |
| 2013/0262302 A1 | 10/2013 | Lettow |
| 2013/0262315 A1 | 10/2013 | Hruska |
| 2013/0262316 A1 | 10/2013 | Hruska |

(56) References Cited

U.S. PATENT DOCUMENTS

| | | |
|---|---|---|
| 2013/0262317 A1 | 10/2013 | Collinge |
| 2013/0275300 A1 | 10/2013 | Killian |
| 2013/0275307 A1 | 10/2013 | Khan |
| 2013/0275308 A1 | 10/2013 | Paraskeva |
| 2013/0282502 A1 | 10/2013 | Jooste |
| 2013/0282575 A1 | 10/2013 | Mullen |
| 2013/0282588 A1 | 10/2013 | Hruska |
| 2013/0297501 A1 | 11/2013 | Monk et al. |
| 2013/0297504 A1 | 11/2013 | Nwokolo |
| 2013/0297508 A1 | 11/2013 | Belamant |
| 2013/0304649 A1 | 11/2013 | Cronic |
| 2013/0308778 A1 | 11/2013 | Fosmark |
| 2013/0311382 A1 | 11/2013 | Fosmark |
| 2013/0317982 A1 | 11/2013 | Mengerink |
| 2013/0332344 A1 | 12/2013 | Weber |
| 2013/0339253 A1 | 12/2013 | Sincai |
| 2013/0346305 A1 | 12/2013 | Mendes |
| 2013/0346314 A1 | 12/2013 | Mogollon |
| 2014/0007213 A1 | 1/2014 | Sanin |
| 2014/0013106 A1 | 1/2014 | Redpath |
| 2014/0013114 A1 | 1/2014 | Redpath |
| 2014/0013452 A1 | 1/2014 | Aissi et al. |
| 2014/0019352 A1 | 1/2014 | Shrivastava |
| 2014/0025581 A1 | 1/2014 | Calman |
| 2014/0025585 A1 | 1/2014 | Calman |
| 2014/0025958 A1 | 1/2014 | Calman |
| 2014/0032417 A1 | 1/2014 | Mattsson |
| 2014/0032418 A1 | 1/2014 | Weber |
| 2014/0040137 A1 | 2/2014 | Carlson |
| 2014/0040139 A1 | 2/2014 | Brudnicki |
| 2014/0040144 A1 | 2/2014 | Plomske |
| 2014/0040145 A1 | 2/2014 | Ozvat |
| 2014/0040148 A1 | 2/2014 | Ozvat |
| 2014/0040628 A1 | 2/2014 | Fort |
| 2014/0041018 A1 | 2/2014 | Bomar |
| 2014/0046853 A1 | 2/2014 | Spies |
| 2014/0047551 A1 | 2/2014 | Nagasundaram et al. |
| 2014/0052532 A1 | 2/2014 | Tsai |
| 2014/0052620 A1 | 2/2014 | Rogers |
| 2014/0052637 A1 | 2/2014 | Jooste |
| 2014/0068706 A1 | 3/2014 | Aissi |
| 2014/0074637 A1 | 3/2014 | Hammad |
| 2014/0108172 A1 | 4/2014 | Weber et al. |
| 2014/0114857 A1 | 4/2014 | Griggs et al. |
| 2014/0143137 A1 | 5/2014 | Carlson |
| 2014/0149293 A1 | 5/2014 | Laracey |
| 2014/0164243 A1 | 6/2014 | Aabye et al. |
| 2014/0188586 A1 | 7/2014 | Carpenter et al. |
| 2014/0249945 A1 | 9/2014 | Gauthier |
| 2014/0294701 A1 | 10/2014 | Dai et al. |
| 2014/0297534 A1 | 10/2014 | Patterson |
| 2014/0310183 A1 | 10/2014 | Weber |
| 2014/0324690 A1 | 10/2014 | Allen et al. |
| 2014/0330721 A1 | 11/2014 | Wang |
| 2014/0330722 A1 | 11/2014 | Laxminarayanan et al. |
| 2014/0331265 A1 | 11/2014 | Mozell et al. |
| 2014/0337236 A1 | 11/2014 | Wong et al. |
| 2014/0344153 A1 | 11/2014 | Raj et al. |
| 2014/0372308 A1 | 12/2014 | Sheets |
| 2015/0019443 A1 | 1/2015 | Sheets et al. |
| 2015/0032625 A1 | 1/2015 | Dill |
| 2015/0032626 A1 | 1/2015 | Dill |
| 2015/0032627 A1 | 1/2015 | Dill |
| 2015/0046338 A1 | 2/2015 | Laxminarayanan |
| 2015/0046339 A1 | 2/2015 | Wong et al. |
| 2015/0052064 A1 | 2/2015 | Karpenko et al. |
| 2015/0081544 A1 | 3/2015 | Wong et al. |
| 2015/0088756 A1 | 3/2015 | Makhotin et al. |
| 2015/0106239 A1 | 4/2015 | Gaddam et al. |
| 2015/0112870 A1 | 4/2015 | Nagasundaram et al. |
| 2015/0112871 A1 | 4/2015 | Kumnick |
| 2015/0120472 A1 | 4/2015 | Aabye et al. |
| 2015/0127529 A1 | 5/2015 | Makhotin et al. |
| 2015/0127547 A1 | 5/2015 | Powell et al. |
| 2015/0140960 A1 | 5/2015 | Powell et al. |
| 2015/0142673 A1 | 5/2015 | Nelsen et al. |
| 2015/0161597 A1 | 6/2015 | Subramanian et al. |
| 2015/0178724 A1 | 6/2015 | Ngo et al. |
| 2015/0180836 A1 | 6/2015 | Wong et al. |
| 2015/0186864 A1 | 7/2015 | Jones et al. |
| 2015/0193222 A1 | 7/2015 | Pirzadeh et al. |
| 2015/0195133 A1 | 7/2015 | Sheets et al. |
| 2015/0199679 A1 | 7/2015 | Palanisamy et al. |
| 2015/0199689 A1 | 7/2015 | Kumnick et al. |
| 2015/0220917 A1 | 8/2015 | Aabye et al. |
| 2015/0269566 A1 | 9/2015 | Gaddam et al. |
| 2015/0278799 A1 | 10/2015 | Palanisamy |
| 2015/0287037 A1 | 10/2015 | Salmon |
| 2015/0312038 A1 | 10/2015 | Palanisamy |
| 2015/0319158 A1 | 11/2015 | Kumnick |
| 2015/0324736 A1 | 11/2015 | Sheets |
| 2015/0332262 A1 | 11/2015 | Lingappa |
| 2015/0356560 A1 | 12/2015 | Shastry et al. |
| 2015/0363781 A1 | 12/2015 | Badenhorst |
| 2016/0028550 A1 | 1/2016 | Gaddam et al. |
| 2016/0036790 A1 | 2/2016 | Shastry et al. |
| 2016/0042263 A1 | 2/2016 | Gaddam et al. |
| 2016/0065370 A1 | 3/2016 | Le Saint et al. |
| 2016/0092696 A1 | 3/2016 | Guglani et al. |
| 2016/0092872 A1 | 3/2016 | Prakash et al. |
| 2016/0092874 A1 | 3/2016 | O'Regan |
| 2016/0094530 A1 | 3/2016 | Mihaylov et al. |
| 2016/0103675 A1 | 4/2016 | Aabye et al. |
| 2016/0119296 A1 | 4/2016 | Laxminarayanan et al. |
| 2016/0132878 A1 | 5/2016 | O'Regan |
| 2016/0140545 A1 | 5/2016 | Flurscheim et al. |
| 2016/0148197 A1 | 5/2016 | Dimmick |
| 2016/0148212 A1 | 5/2016 | Dimmick |
| 2016/0171479 A1 | 6/2016 | Prakash et al. |
| 2016/0173483 A1 | 6/2016 | Wong et al. |
| 2016/0197725 A1 | 7/2016 | Hammad |
| 2016/0210628 A1 | 7/2016 | McGuire |
| 2016/0217461 A1 | 7/2016 | Gaddam |
| 2016/0218875 A1 | 7/2016 | Le Saint et al. |
| 2016/0224976 A1 | 8/2016 | Basu |
| 2016/0224977 A1 | 8/2016 | Sabba et al. |
| 2016/0232527 A1 | 8/2016 | Patterson |
| 2016/0239842 A1 | 8/2016 | Cash et al. |
| 2016/0269391 A1 | 9/2016 | Gaddam et al. |
| 2016/0308995 A1* | 10/2016 | Youdale ............... H04W 4/50 |
| 2017/0046696 A1 | 2/2017 | Powell et al. |
| 2017/0076288 A1 | 3/2017 | Awasthi |
| 2017/0103387 A1 | 4/2017 | Weber |
| 2017/0109745 A1 | 4/2017 | Al-Bedaiwi |
| 2017/0148013 A1 | 5/2017 | Rajurkar |
| 2017/0163617 A1 | 6/2017 | Narayan |
| 2017/0163629 A1 | 6/2017 | Law |
| 2017/0186001 A1 | 6/2017 | Reed et al. |
| 2017/0200156 A1 | 7/2017 | Karpenko |
| 2017/0200165 A1 | 7/2017 | Narayan |
| 2017/0201520 A1 | 7/2017 | Chandoor |
| 2017/0220818 A1 | 8/2017 | Nagasundaram et al. |
| 2017/0221054 A1 | 8/2017 | Flurscheim |
| 2017/0221056 A1 | 8/2017 | Karpenko |
| 2017/0228723 A1 | 8/2017 | Taylor |
| 2017/0236113 A1 | 8/2017 | Chitalia |
| 2017/0293914 A1 | 10/2017 | Girish |
| 2017/0295155 A1 | 10/2017 | Wong et al. |
| 2017/0364903 A1 | 12/2017 | Lopez |
| 2017/0364914 A1 | 12/2017 | Howard |
| 2017/0373852 A1 | 12/2017 | Cassin |
| 2018/0006821 A1 | 1/2018 | Kinagi |
| 2018/0075081 A1 | 3/2018 | Chipman |
| 2018/0247303 A1 | 8/2018 | Raj |
| 2018/0262334 A1 | 9/2018 | Hammad |
| 2018/0268399 A1 | 9/2018 | Spector |
| 2018/0268405 A1 | 9/2018 | Lopez |
| 2018/0285875 A1 | 10/2018 | Law |
| 2018/0324184 A1 | 11/2018 | Kaja |
| 2018/0324584 A1 | 11/2018 | Lopez |
| 2019/0020478 A1 | 1/2019 | Girish |

(56) References Cited

U.S. PATENT DOCUMENTS

| | | |
|---|---|---|
| 2019/0066069 A1 | 2/2019 | Faith |
| 2019/0147439 A1 | 5/2019 | Wang |

FOREIGN PATENT DOCUMENTS

| | | | |
|---|---|---|---|
| WO | 2000/014648 | A1 | 3/2000 |
| WO | 2001035304 | A1 | 5/2001 |
| WO | 2001035304 | A9 | 5/2001 |
| WO | 2004/051585 | A2 | 11/2003 |
| WO | 2004042536 | A2 | 5/2004 |
| WO | 2005/001751 | A1 | 6/2004 |
| WO | 2006113834 | A2 | 10/2006 |
| WO | 2009032523 | A1 | 3/2009 |
| WO | 2010078522 | A1 | 7/2010 |
| WO | 2012068078 | A2 | 5/2012 |
| WO | 2012098556 | A1 | 7/2012 |
| WO | 2012116221 | A1 | 8/2012 |
| WO | 2012142370 | A2 | 10/2012 |
| WO | 2012167941 | A1 | 12/2012 |
| WO | 2013048538 | A1 | 4/2013 |
| WO | 2013056104 | A1 | 4/2013 |
| WO | 2013119914 | A1 | 8/2013 |
| WO | 2013179271 | A2 | 12/2013 |
| WO | 2018098492 | | 5/2018 |

OTHER PUBLICATIONS

Dean, et al., U.S. Appl. No. 16/311,144 (unpublished), "Encryption Key Exhange Process Using Access Device," filed Dec. 18, 2018.

PCT/US2017/063514 , "International Search Report and Written Opinion", dated Feb. 13, 2018, 17 pages.

Application No. PCT/US2017/063514 , International Preliminary Report on Patentability, dated Jun. 6, 2019, 13 pages.

Application No. SG11201903468R , Notice of Decision to Grant, dated Aug. 27, 2021, 4 pages.

Application No. SG11201903468R , Written Opinion, dated Sep. 23, 2020, 8 pages.

\* cited by examiner

ACCESS IDENTIFIER PROVISIONING TO APPLICATION

CROSS-REFERENCES TO RELATED APPLICATIONS

This application is a National Stage of International Application No. PCT/US2017/063514 filed Nov. 28, 2017, which is a non-provisional of and claims the benefit of the filing date of U.S. Provisional Application No. 62/427,046, filed on Nov. 28, 2016, of which are all herein incorporated by reference.

BACKGROUND

There are many different types of systems and methods that allow a user to access resources. Such systems and methods can be inconvenient and the security of such systems and methods can be improved.

In one example of a conventional system for accessing secure data, a user operating a user device needs to register with a computer that is used to access the secure data. The computer is operated by a service provider. It is relatively straightforward for the user to access the secure data if the user has an account with that service provider. However, if the user does not have such an account, then the user will be unable to access the secure data. Furthermore, even if the user has an account to access the secure data, the credentials associated with the account that are used to access the secure data constitute sensitive information. Such sensitive information is susceptible to being illegally obtained from unauthorized persons.

In another example, a user may wish to conduct a specific interaction with a particular resource provider or an application computer associated with an application on the user's user device (e.g., a ride-sharing application). In order to do so, the user may be asked to provide a payment credential such as a credit card number. While this is relatively straightforward if the user has a credit card, it is not if the user does not have a credit card. If the user does not have a credit card, then the user is not able to conduct the desired interaction. Furthermore, even if the user does have a credit card account to conduct the desired interaction, the credit card number that is used to access the secure data constitutes sensitive information. The credit card number is susceptible to being illegally obtained from unauthorized persons. Still further, the issuance of a payment device identifier such as a credit card number is slow as it can take 3-5 days to issue.

Embodiments of the invention address these and other problems.

BRIEF SUMMARY

Embodiments of the invention relate to systems and methods for providing user devices with access tokens. Some embodiments of the invention can allow for the performance of on demand interactions such as payment transactions using third party applications. Embodiments of the invention can allow a user (e.g., a consumer), who may possess an account at an issuer, to use those accounts to quickly and conveniently conduct on demand payment transactions using third party online applications or platforms (e.g., an online messaging platform). Certain embodiments may be particularly useful to users of third party applications that possess an account at an authorizing entity such as an issuer, but do not possess portable transaction devices (e.g., debit cards). In embodiments of the invention, the issuer may pre-allocate a virtual access identifier such as a virtual primary account number to the account. By having the issuer pre-allocate a virtual primary account number (PAN) for each of the users, embodiments of the invention enable users to perform interactions such as payment transactions nearly instantaneously using the third party applications. The users do not need to first obtain portable payment devices.

One embodiment of the invention is directed to a method comprising: receiving, by a directory service computer from an application on a user device, a request to provide an access token that is associated with a primary access identifier for an account, the request comprising identifying information that identifies the account; retrieving, by the directory service computer, a virtual access identifier based on the identifying information; and transmitting a request, by the directory service computer to a token service computer, that the access token be provisioned, wherein the request comprises the virtual access identifier, and the token service computer thereafter provisions the user device or an application computer associated with the user device with the access token.

Another embodiment of the invention is directed to a system comprising: a directory service computer, the directory service computer comprising a data processor, and a computer readable medium, the computer readable medium comprising code, executable by the data processor, to cause the directory service computer to receive from an application on a user device, a request to provide an access token that is associated with a primary access identifier for an account, the request comprising identifying information that identifies the account, retrieve a virtual access identifier based on the identifying information, and transmit a request, by the directory service computer to a token service computer, that the access token be provisioned, wherein the request comprises the virtual access identifier, and the token service computer thereafter provisions the user device or an application computer associated with the user device with the access token.

Another embodiment of the invention is directed to a method comprising: receiving, by a token service computer and from a directory service computer, a virtual access identifier and a request to provision a user device or an application computer associated with the user device with an access token; transmitting, by the token service computer, the access token to the user device or the application computer; receiving, by the token service computer, the access token, the access token being in an authorization request message; determining, by the token service computer, the virtual access identifier using the access token; and providing, by the token service computer, the virtual access identifier to a processing computer, the processing computer transmitting an authorization request message comprising the virtual access identifier to an authorizing computer for authorization, the authorizing computer using the virtual access identifier to determine a primary access identifier to conduct an interaction.

These and other embodiments of the invention are described in further detail below.

DETAILED DESCRIPTION

Figure 1:
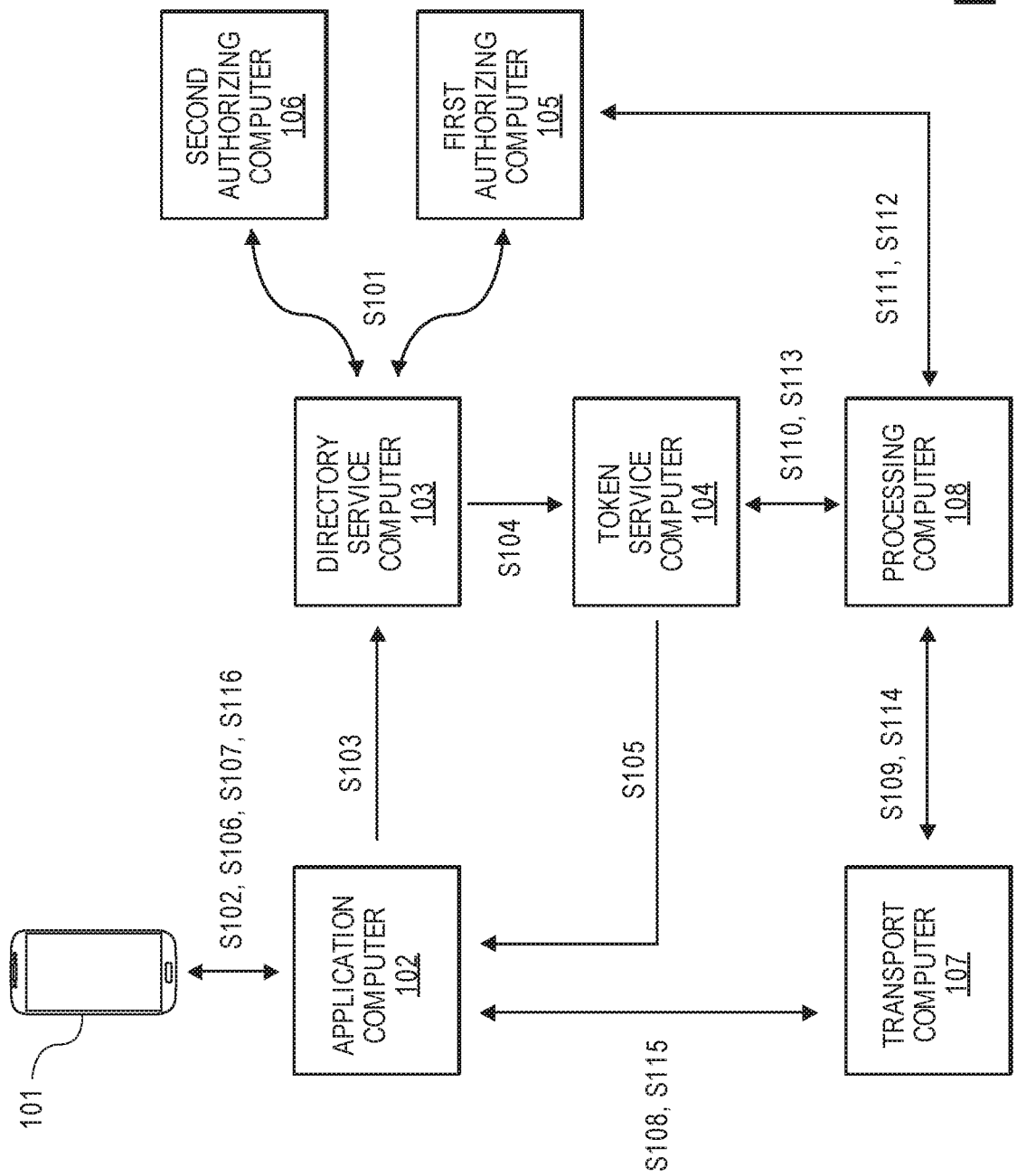
FIG. 1 shows a block diagram illustrating a system as well as a process flow according to an embodiment of the invention.

Before discussing specific embodiments and examples, some descriptions of terms used herein are provided below.

An "access token" may include a substitute identifier for some information. For instance, an access token may include a series of alphanumeric characters that may be used as a substitute for an original account identifier. In some cases, the token may be a payment token, which may include an identifier for a payment account that is a substitute for a real account identifier, such as a primary account number (PAN), or a virtual account identifier. For example, an access token "4900 0000 0000 0001" may be used in place of a PAN "4147 0900 0000 1234." In some embodiments, an access token may be "format preserving" and may have a numeric format that conforms to the account identifiers used in existing processing networks (e.g., ISO 8583 financial transaction message format). In some embodiments, an access token may be used in place of a PAN to initiate, authorize, settle or resolve a payment transaction. The access token may also be used to represent an original credential in other systems where the original credential would typically be provided. In some embodiments, an access token can be used to access secure data on a computer, or access a restricted location (e.g., a transit location or building).

A "primary access identifier" may include any suitable data that may allow a user to access a resource such as data, goods, money, services, etc. In some embodiments, a "primary access identifier" may be a PAN (primary account number) that can be used to conduct a payment transaction, an original badge number that allows a person to access a particular location or particular data on a computer, insurance account numbers, etc. Other examples of primary access identifiers may include checking account identifiers (e.g., numbers), savings account identifiers, money market account identifiers, brokerage account identifiers, etc. A "primary access identifier" may also be characterized as a "real access identifier."

A "virtual access identifier" may include a proxy for a primary access identifier. In embodiments of the invention, a virtual access identifier cannot be used to directly conduct an interaction to obtain a resource. For example, a virtual access identifier such as a virtual PAN may not be used to directly conduct a payment transaction. A virtual access identifier such as a virtual badge number cannot be used to directly access a building or secure data. In embodiments of the invention, the format of the virtual access identifier may be the same or different than the primary access identifier.

"Account information" may refer to any information associated with a user's account. Such information may be directly related to the account or may be derived from information related to the account. Examples of account information may include an account identifier, a username, a password, user information (e.g., name, age, email address, shipping address, etc.). In some cases, account information may also be known as payment account information, card account information, or the like, and may be associated with a payment device (e.g., payment card). For example, account information may include a PAN (Primary Account Number or "account number"), user name, expiration date, CVV (Card Verification Value), dCVV (Dynamic Card Verification Value), CVV2 (Card Verification Value 2), CVC3 card verification values, etc.

A "resource providing entity" may be an entity that may make resources available to a user. Resource providing entities may also be known as resource providers. Examples of resource providing entities include resource providers, vendors, suppliers, owners, traders, wallet providers, service providers, and the like. In some embodiments, such entities may be a single individual, small groups of individuals, or larger groups of individuals (e.g., companies). Resource providing entities may be associated with one or more physical locations (e.g., supermarkets, malls, stores, etc.) and online platforms (e.g., e-commerce websites, online companies, etc.), In some embodiments, resource providing entities may make physical items (e.g., goods, products, etc.) available to the user. In other embodiments, resource providing entities may make digital resources (e.g., electronic documents, currency, electronic files, etc.) available to the user. In other embodiments, resource providing entities may manage access to certain resources by the user. In some embodiments, the resources may be services (e.g., digital wallet services).

A "credential on file" may refer to credentials associated with an account (e.g., username, password, account identifier, account number, etc.) that is on file with a resource provider computer, application computer, digital wallet server, or other entity. In such situations, the credentials may be used by a resource provider and a user to conduct purchases. In a credential on file access request, the user does not need to specifically provide his or her credentials to a resource provider when conducting an access request, since the resource provider computer associated with the resource provider already stores them. Credential on file access requests may vary in frequency and/or amount and may represent an agreement between a user (e.g., cardholder) and a resource provider to purchase goods or services provided over a period of time or on demand. A credential on file may be alternatively referred to as a card on file or an account on file.

A "token service computer" can include a system that services tokens. In some embodiments, a token service computer can facilitate requesting, determining (e.g., generating) and/or issuing tokens, as well as maintaining an established mapping of access tokens to primary or virtual access identifiers (e.g., primary or virtual account numbers (PANs)) in a repository (e.g. token vault). In some embodiments, the token service system may establish a token assurance level for a given token to indicate the confidence level of the token to PAN binding. The token service computer may include or be in communication with a token vault where the generated tokens are stored. The token service computer may support the processing payment transactions submitted using tokens by de-tokenizing the tokens to obtain the actual PANs or virtual PANs. In some embodiments, a token service computer may include a tokenization computer alone, or in combination with other computers such as a transaction processing network computer.

A "token domain" may indicate an area and/or circumstance in which an access token can be used. Examples of token domains may include, but are not limited to, payment channels (e.g., e-commerce, physical point of sale, etc.), POS entry modes (e.g., contactless, magnetic stripe, etc.), and merchant identifiers to uniquely identify where the token can be used. A set of parameters (i.e. token domain restriction controls) may be established as part of token issuance by the token service provider that may allow for enforcing appropriate usage of the token in payment transactions. For example, the token domain restriction controls may restrict the use of the access token with particular presentment modes, such as contactless or e-commerce presentment modes. In some embodiments, the token domain restriction controls may restrict the use of the access token at a particular merchant that can be uniquely identified. Some exemplary token domain restriction controls may require the verification of the presence of a token cryptogram that is unique to a given transaction. In some embodiments, a token domain can be associated with a token requestor.

A "token expiry date" may refer to the expiration date/time of the token. The token expiry date may be passed among the entities of a tokenization ecosystem during transaction processing to ensure interoperability. The token expiration date may be a numeric value (e.g. a 4-digit numeric value). In some embodiments, the token expiry date can be expressed as an time duration as measured from the time of issuance.

A "token request message" may be an electronic message for requesting a token. A token request message may include information usable for identifying a payment account or digital wallet, and/or information for generating a payment token. For example, a token request message may include one or more primary access identifiers, payment credentials, mobile device identification information (e.g. a phone number or MSISDN), a digital wallet identifier, information identifying a token service computer, a merchant identifier, a cryptogram, and/or any other suitable information. Information included in a token request message can be encrypted (e.g., with an issuer-specific key).

A "token response message" may be a message that responds to a token request. A token response message may include an indication that a token request was approved or denied. A token response message may also include an access token such as a payment token, mobile device identification information (e.g. a phone number or MSISDN), a digital wallet identifier, information identifying a tokenization service provider, a merchant identifier, a cryptogram, and/or any other suitable information. Information included in a token response message can be encrypted (e.g., with an issuer-specific key).

A "token requestor identifier" may include any characters, numerals, or other identifiers associated with an entity associated with a network token system. For example, a token requester identifier may be associated with an entity that is registered with the network token system.

A "server computer" can be a powerful computer or a cluster of computers. For example, the server computer can be a large mainframe, a minicomputer cluster, or a group of servers functioning as a unit. In one example, the server computer may be a database server coupled to a Web server.

An "authorization request message" may be an electronic message that requests authorization to proceed with an interaction (e.g., a transaction). For example, in some embodiments, an authorization request message may be sent to a payment processing network and/or an issuer of a payment card to request authorization for a transaction. An authorization request message according to some embodiments may comply with ISO 8583, which is a standard for systems that exchange electronic transaction information associated with a payment made by a consumer using a payment device or payment account. The authorization request message may include an issuer account identifier that may be associated with a payment device or payment account. An authorization request message may also comprise additional data elements corresponding to "identification information" including, by way of example only: a service code, a CVV (card verification value), a dCVV (dynamic card verification value), an expiration date, etc. An authorization request message may also comprise "transaction information," such as any information associated with a current transaction, such as the transaction amount, merchant identifier, merchant location, etc., as well as any other information that may be utilized in determining whether to identify and/or authorize a transaction. In other embodiments, an authorization request message may request authorization to access secure data or a secure location.

An "authorization response message" may be an electronic message reply to an authorization request message. In some embodiments, the authorization response message may be generated by an issuing financial institution or a payment processing network. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the payment processing network) to the merchants access device (e.g. POS equipment) that indicates approval of the transaction. The code may serve as proof of authorization.

A "user device" may be any suitable electronic device operated by a user. User devices may include mobile and non-mobile devices with remote communication capabilities.

A "mobile device" (sometimes referred to as a mobile communication device) may comprise any electronic device that may be transported and operated by a user, which may also provide remote communication capabilities to a network. Examples of remote communication capabilities include using a mobile phone (wireless) network, wireless data network (e.g. 3G, 4G or similar networks), Wi-Fi, Bluetooth, Bluetooth Low Energy (BLE), Wi-Max, or any other communication medium that may provide access to a network such as the Internet or a private network. Examples of mobile devices include mobile phones (e.g. cellular phones), PDAs, tablet computers, net books, laptop computers, wearable devices (e.g., watches), vehicles such as automobiles and motorcycles, personal music players, handheld specialized readers, etc. A mobile device may comprise any suitable hardware and software for performing such functions, and may also include multiple devices or components (e.g. when a device has remote access to a network by tethering to another device—i.e. using the other device as a modem—both devices taken together may be considered a single mobile device).

A "payment device" may include a device that may be used to conduct a financial transaction, such as to provide payment information to a merchant. A payment device may be in any suitable form. For example, suitable payment devices can be hand-held and compact so that they can fit into a consumer's wallet and/or pocket (e.g., pocket-sized) and may be in the form of a mobile device as described above. They may include smart cards, magnetic stripe cards, keychain devices, etc. Specific examples of payment devices may include credit, debit, and stored value payment cards. Other examples of payment devices include cellular phones, personal digital assistants (PDAs), pagers, payment cards, security cards, access cards, smart media, transponders, 2-D barcodes, an electronic or digital wallet, and the like. Such devices can operate in either a contact or contactless mode.

"User identifying information" can be any information that can identify the user. User identifying information can include, but is not limited to, a primary account number (PAN), telephone, e-mail address, zip code, mailing address, photo identification, personal identification number (PIN), etc. User identifying information may also include real or primary access identifiers (e.g., savings, checking, or money market account numbers).

A "processor" or "data processor" may include any suitable data computation device or devices. A processor may comprise one or more microprocessors working together to accomplish a desired function. The processor may include a CPU comprising at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

A "memory" may be any suitable device or devices that can store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

Embodiments of the invention can relate to providing an access token to a user device, via a directory service computer. The directory service computer may obtain a virtual access identifier associated with a primary access identifier from an authorizing computer. The primary access identifier may be a savings or checking account number at an issuer operating the authorizing computer. Once the request for the access token is received by the directory service computer, it can transmit a message to a token service computer to issue the access token to the user device or an application computer associated with an application on the user device. Once the user device has access to the access token, the user device may use the access token to conduct an interaction.

Some embodiments of the invention relate to performing on demand payment transactions using third party applications that may be associated with one or more application computers. Embodiments of the invention can allow a user (e.g., a consumer), who may possess an account at an issuer, to quickly and conveniently use those accounts to conduct on demand payment transactions using third party online applications or platforms (e.g., an online messaging platform). In certain situations, the adoption of payment devices like credit cards and debit cards may lag the adoption of issuer accounts such as savings accounts or checking accounts. Thus, while individuals may be able to withdraw money by manually visiting their banking institution or perform payment transactions using traditional methods (e.g., cash or check), these same individuals may experience difficulty in using mobile devices to conduct payment transactions online and/or through third party applications that are not banking applications (e.g., social networking applications, merchant applications, messaging applications, etc.). Additionally, the process of obtaining a credit card or debit card that is associated with an issuer account may be relatively slow and cumbersome.

There are many technical advantages associated with embodiments of the invention. For example, in some embodiments of the invention, a primary access identifier can only be present at the authorizing computer or the directory service computer. The primary access identifier does not need to be exposed outside of these entities. This decreases the chance that fraudulent transactions can be conducted with the primary access identifier, since the likelihood that it can be fraudulently obtained is very low. This consequently improves upon data security relative to conventional systems. In addition, the access token may be used to conduct an interaction, even though the primary account identifier may not actually be configured for use to conduct the user's desired interaction. For example, the real or primary account identifier may be a savings account number, and it may not be capable of being used to conduct a credit card transaction, which may be the desired interaction. Embodiments of the invention can issue an access token to an application on a user device. The access token can be used to conduct a transaction such as a credit card transaction, even though the user may not have an actual credit card account. Still further, because virtual access identifiers for primary account identifiers are provided to a directory service computer before a user requests an access token, the issuance of access tokens is fast and convenient. This increases the functionality of conventional primary access identifiers. Further, authorizing entities such as issuers can control how those virtual access identifiers are processed against their corresponding real or primary account identifiers. This helps to minimize major network infrastructure changes when accomplishing the goals of embodiments of the invention.

FIG. 1 shows a system according to embodiments of the invention. Embodiments of the invention can include more or less components than are shown in FIG. 1. Although the specific examples described with respect to FIG. 1 include descriptions of payment tokens and payment processes, it is understood that embodiments of the invention are not limited thereto. Embodiments of the invention can also apply to the use of an access token to gain access to sensitive or secret data, as well as access to restricted locations (e.g., transit stations).

In particular, FIG. 1 shows a system comprising user device 101 and application computer 102. The application computer 102 may communicate with directory service computer 103, token service computer 104, and optional transport computer 107. In some embodiments, the application computer 102 is not needed, and the user device 101 may communicate directly with the directory service computer 103, token service computer 104, and optional transport computer 107. The directory service computer 103 may also communicate with first and second authorizing computers 105, 106. A processing computer 108 can communicate with the transport computer 107, the token service computer 104, as well as with the first and second authorizing computers 105, 106. In some embodiments, the directory service computer 103, the token service computer 104, and/or the processing computer 108 may form parts of the same system.

The entities in FIG. 1 may communicate using any suitable communications networks. Suitable communications networks may be any one and/or the combination of the following: a direct interconnection; the Internet; a Local Area Network (LAN); a Metropolitan Area Network (MAN); an Operating Missions as Nodes on the Internet (OMNI); mesh networks, a secured custom connection; a Wide Area Network (WAN); a wireless network (e.g., employing protocols such as, but not limited to a Wireless Application Protocol (WAP), I-mode, and/or the like); and/or the like.

Messages between the entities, providers, networks, and devices illustrated in FIG. 1 may be transmitted using a secure communications protocols such as, but not limited to, File Transfer Protocol (FTP); HyperText Transfer Protocol (HTTP); Secure Hypertext Transfer Protocol (HTTPS); Secure Socket Layer (SSL), ISO (e.g., ISO 8583) and/or the like.

The user device 101 may be a mobile device, a laptop, a desktop, or the like that may be used by the user to run a third party application that may be supported by one or more application servers, including application computer 102. The user may possess an issuer account (e.g., a savings account, a checking account) at an issuer. However, the user may have yet to receive or obtain a payment device (e.g., a credit card or a debit card) that can be used to conduct a payment transaction through the third party application.

Figure 2:
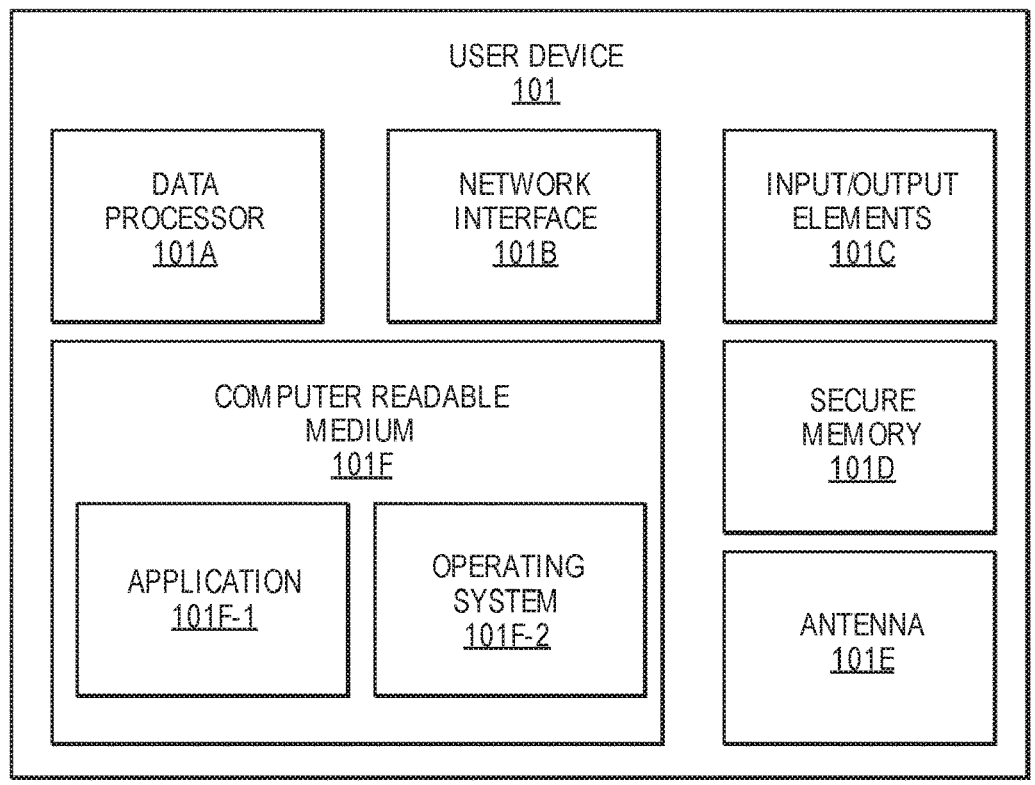
FIG. 2 shows a block diagram of a user device according to an embodiment of the invention.

A block diagram of an exemplary user device 101 is shown in FIG. 2. The user device 101 shown in FIG. 2 includes a data processor 101A, and a network interface 101B, input/output elements 101O, a secure memory 101D, an antenna 101E, and a computer readable medium 101F operatively coupled to the data processor 101A. The computer readable medium 101F may store an application 101F-1, as well as an operating system 101F-2. The application 101F-1 may be any suitable application, including a merchant application, a social networking application, a messing application etc. The operating system 101F-2 may be any commercially available operating system such as a Windows™ or IGS™ based operating system.

The input/output elements 101C may include devices that allow the user device 101 to input and output data. Examples of output devices include speakers, displays, etc. Examples of input devices include keyboards, peripheral devices such as mice, touchscreens, etc.

The network interface 101B (as well as the other network interfaces described herein) may be any suitable combination of hardware and software that enables data to be transferred to and from the user device 101. The network interface 101B may allow the user device 101 to communicate data to and from another device (e.g., application computer 102). Some examples of the network interface 101B may include a modem, a physical network interface (such as an Ethernet card or other Network Interface Card (NIC)), a virtual network interface, a communications port, a Personal Computer Memory Card International Association (PCMCIA) slot and card, or the like. The wireless protocols enabled by the network interface 101B may include Wi-Fi™.

The antenna 101E may assist in connectivity to the Internet or other communications networks and enable data transfer functions. The antenna 101E may enable SMS, USSD, as well as other types of cellular communications, such as voice call and data communications The directory service computer 103 may implement a directory service. In some embodiments, the directory service computer 103 may form part of the processing computer 108, which may be a payment processing network. The directory service computer 103 may enable third party applications to request access tokens for user devices by providing information that identifies an authorizing entity such as an issuer account of a user. It should be noted that the directory service computer 103 is not limited to receiving requests from just a single type of third party application, and may be configured to receive such requests from application servers that support different third party applications.

Figure 3:
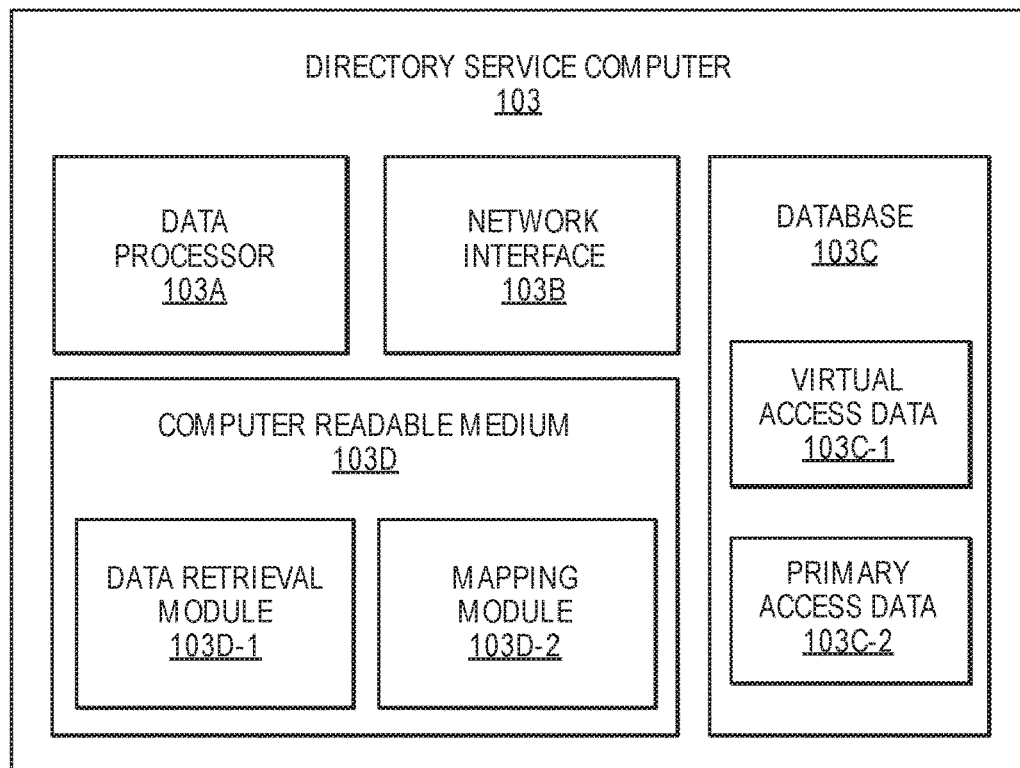
FIG. 3 shows a block diagram of a directory service computer according to an embodiment of the invention.

A block diagram of an exemplary directory service computer 103 is shown in FIG. 3. The directory service computer 103 shown in FIG. 2 includes a data processor 103A, and a network interface 103B, a database 103C and a computer readable medium 103D operatively coupled to the data processor 103A. The computer readable medium 103D may store a data retrieval module 103D-1 and a mapping module 103D-2.

The database 103O (as well as the other databases described herein) may store any suitable data. Examples of suitable databases may include a conventional, fault tolerant, relational, scalable, secure database such as those commercially available from Oracle™ or Sybase™. The database 103C may store virtual access data 103C-1 such as virtual access identifiers, and primary access data 103C-2 such as primary access identifiers.

The data retrieval module 103D-1 may comprise code, executable by the data processor 103A, for retrieving data and storing data to the database 1030. The mapping module may comprise code, executable by the data processor 103A, for mapping virtual access data (e.g., virtual access identifiers) to primary access data (e.g., primary access identifiers).

The computer readable medium 103D also comprise code, executable by the data processor 103A for receiving, from an application on a user device, a request to provide an access token that is associated with a primary access identifier for an account, the request comprising identifying information that identifies the account; retrieving a virtual access identifier based on the identifying information; and transmitting a request, to a token service computer 104, that the access token be provisioned, wherein the request comprises the virtual access identifier, and the token service computer 104 thereafter provisions the user device 101 or an application computer 102 associated with the user device 101 with the access token.

The token service computer 104 may implement a tokenizing service. In some embodiment, the token service computer 104 may also form part of a payment processing network. Upon receiving a payment token request that includes a virtual PAN, the tokenizing service may substitute the virtual PAN with a payment token. The payment token may be a substitute for the virtual PAN, and the virtual PAN may be tied to a primary or real PAN in an issuers computer.

Figure 4:
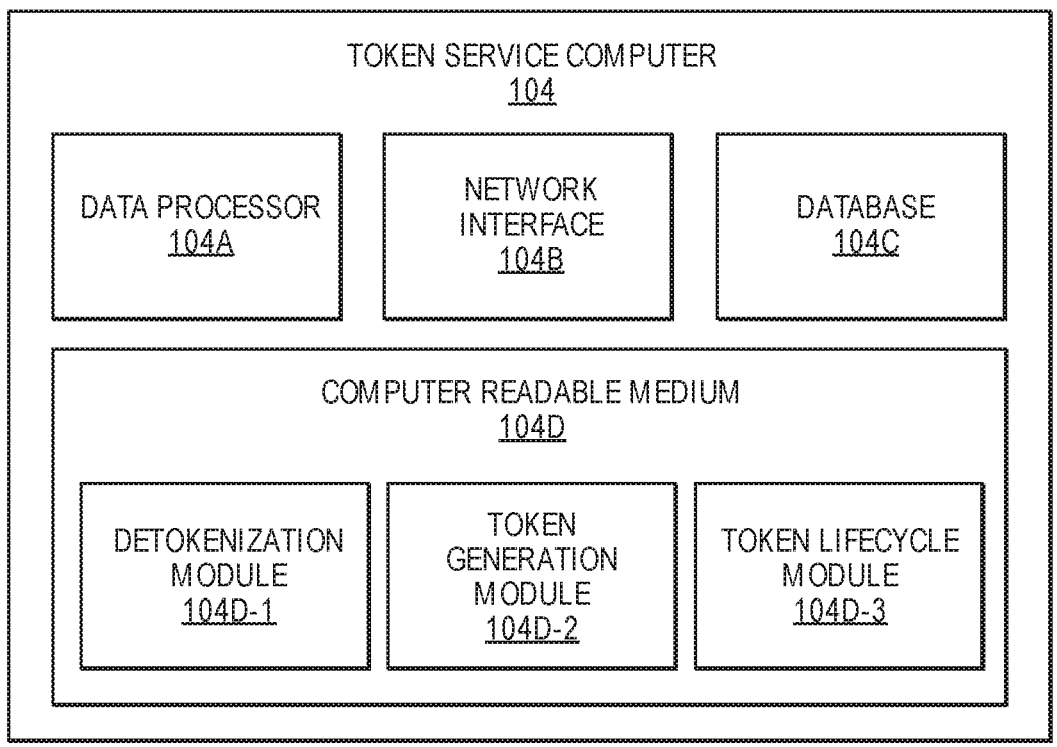
FIG. 4 shows a block diagram of a token service computer according to an embodiment of the invention.

A block diagram of an exemplary token service computer 104 is shown in FIG. 4. The token service computer 104 shown in FIG. 4 includes a data processor 104A, and a network interface 104B, a database 1040 and a computer readable medium 104D operatively coupled to the data processor 104A. The computer readable medium 104D may store a detokenization module 104D-1, a token generation module 104D-2, and a token lifecycle module 104D-3. The database 104C may store a data table correlating access tokens with virtual access identifiers.

The detokenization module 104D-1 may comprise code that when executed by the data processor 104A, can detokenize a received access token and resolve it into a virtual access identifier (e.g., a virtual PAN) or possibly a primary or real identifier (e.g., a primary PAN).

The token generation module 104D-2 may include code, executable by the data processor 104A, to generate access tokens. The token lifecycle module 104D-3, may comprise code, executable by the data processor 104A to manage the lifecycle of distributed access tokens. For example, access tokens may only be used under certain domain controls or conditions (e.g., a certain time period, a certain type of transaction, etc.).

The computer readable medium 104D may also comprise code, executable by the processor, for performing a method including receiving, by a token service computer and from a directory service computer, a virtual access identifier and a request to provision a user device or an application computer associated with the user device with an access token; transmitting, by the token service computer, the access token to the user device or the application computer associated with the user device; receiving, by the token service computer, the access token, the access token being in an authorization request message; determining, by the token service computer, the virtual access identifier using the access token; and providing, by the token service computer, the virtual access identifier to a processing computer, the processing computer transmitting an authorization request message comprising the virtual access identifier to an authorizing computer for authorization, the authorizing computer using the virtual access identifier to determine a primary access identifier.

The first and second authorizing computers 105, 106 may be operated by first and second issuers, respectively. An issuer may maintain one or more issuer accounts for one or more account holders, which may include the user of user device 101, Each of the issuer accounts may be associated with an account number, where each account number may comprise a first portion that uniquely identifies the issuer (e.g., a routing number) and a second portion that uniquely identifies the issuer account within the issuer (e.g., account number). Some of the issuer accounts maintained by the issuer may each be associated with a payment device that is associated with a PAN. For example, an account holder of the issuer may have applied for and obtained a debit card, the debit card having an actual PAN. The account holder may use the debit card to make various types of payment transactions including: (1) peer to peer (P2P) payment transactions, (2) payment transactions with online merchants, and (3) payment transactions with brick-and-mortar store merchants.

Other issuer accounts that are maintained by the issuer may not be associated with a payment device. For instance, an issuer account could be a savings or brokerage account that does not have a corresponding payment device associated with it.

Figure 5:
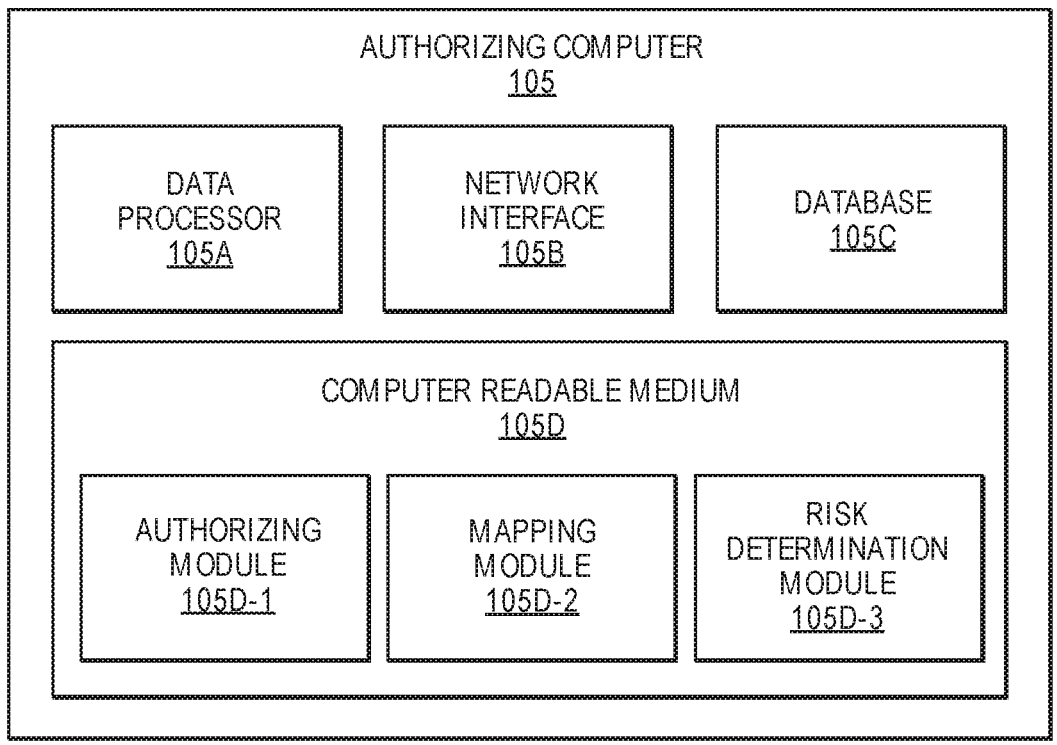
FIG. 5 shows a block diagram of an authorizing computer according to an embodiment of the invention.

A block diagram of an exemplary authorizing computer is shown in FIG. 5. The authorizing computer 105 shown in FIG. 5 includes a data processor 105A, a network interface 105B, a database 1050 and a computer readable medium 105D operatively coupled to the data processor 105A. The computer readable medium 105D may store an authorizing module 105D-1, a mapping module 105D-2, and a risk determination module 105D-3.

The authorizing module 105D-1 may include code executable, by the data processor 105A, to determine whether or not to authorize a transaction. Criteria for authorizing a transaction may include whether the user has sufficient authority (e.g., credit) to conduct the requested interaction, whether the interaction requested is potentially fraudulent, etc.

The mapping module 105D-2 may store mappings between virtual access identifiers (virtual PANs) and real or primary access identifiers (e.g., real or primary PANS). If a virtual access identifier is received by the authorizing computer 105, then the primary access identifier may be determined. An action (e.g., debiting the account) may then be taken with respect to an account associated with the access identifier. The risk determination module 105D-2 may include code, executable by the data processor 105A, to determine whether the current interaction requested by the user device 101 is fraudulent or not.

Referring again to FIG. 1, the transport computer 107 may be located between (in an operational sense) the application computer 102 and the processing computer 108. The transport computer 107 may be operated by an entity such as an acquirer. An acquirer can maintain an account of any number of merchants with which users may wish to interact.

The processing computer 108 may route or switch messages between a number of transport computers including the transport computer 107, and a number of authorizing computers 105, 106. The processing computer 108 may be configured to provide authorization services, and clearing and settlement services for payment transactions. The processing computer 108 may be or be part of a payment processing network, and may include data processing subsystems, networks, and operations used to support and deliver authorization services, exception file services, and clearing and settlement services. An exemplary payment processing network may include VisaNet™. Payment processing networks such as VisaNet™ are able to process credit card transactions, debit card transactions, and other types of commercial transactions. VisaNet™, in particular includes a Visa Integrated Payments (VIP) system which processes authorization requests and a Base II system which performs clearing and settlement services. Furthermore, the payment processing network may include a server computer and may use any suitable wired or wireless telecommunications network, including the Internet. In some embodiments, the processing computer may forward an authorization request received from a transport computer 107 to the authorizing computer via a communication channel. The processing computer may further forward an authorization response message received from the authorizing computer to the transport computer.

Figure 6:
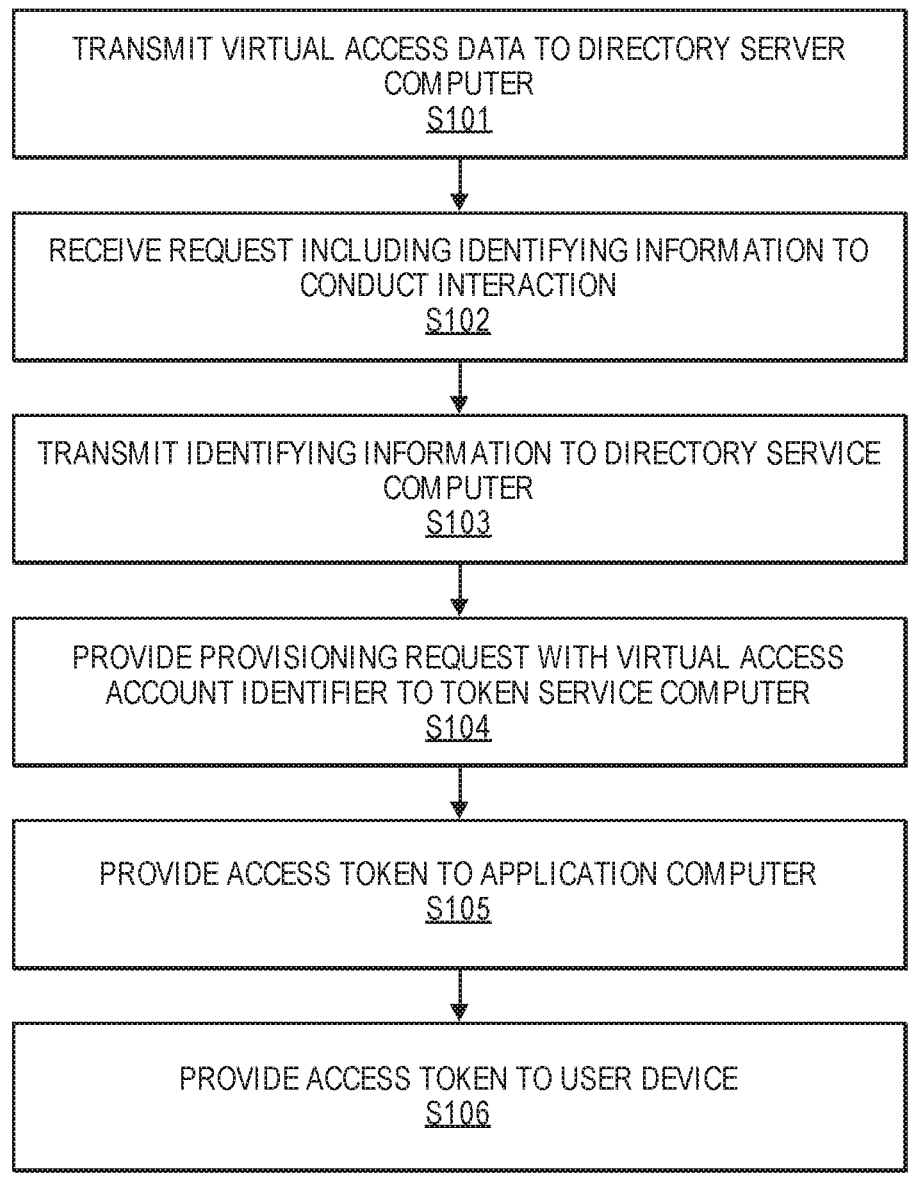
FIG. 6 shows a flowchart illustrating a method for provisioning a user device or an application computer with an access token.

Methods according to embodiments of the invention can be described with reference to FIGS. 1, 6, and 7, as well as other Figures. The specific examples described below refer to the use of a virtual PAN (primary account number) as a virtual access identifier, a real PAN as a primary access identifier, and a payment token as an access token. It is understood that embodiments of the invention may be used in processing other than payment processing.

At step S101, virtual access data such as virtual access identifiers are provided to a directory service computer 103 from one or more authorizing computers. For example, one or more of the first and second authorizing computers 105, 106 can be issuer computers. An issuer computer of an issuer can allocate (i.e., pre-allocates) a virtual PAN for each issuer account maintained by the issuer that is not already associated with a virtual PAN and communicates the associations between virtual PANs and issuer accounts to the directory service computer 103. For example, if the issuer associated with first authorizing computer 105 maintains both issuer accounts that are already associated with payment device identifiers and issuer accounts that are not associated with payment device identifiers, the authorizing computer 105 may allocate virtual access identifiers (e.g., virtual PANs) for the issuer accounts not already associated with payment device identifiers. As a result, each of the issuer accounts maintained by the issuer may be associated with either payment device identifier or a virtual access identifier such as a virtual PAN. In some embodiments, a virtual PAN that is generated at this step may initially be dormant and incapable of being used to perform a payment transaction until the virtual PAN is activated at a later time.

In some embodiments, to avoid having different issuers (e.g., the issuer associated with the first authorizing computer 105 and another issuer associated with the second authorizing computer 106) allocate or generate identical virtual PAN numbers to their issuer accounts, a payment processing network may form an arrangement with the issuers where each issuer receives a different range of numbers from which to allocate to virtual PANs.

The first authorizing computer 105 may store the associations in memory using a table (e.g., a database table stored in a database) having multiple rows and columns, where one of the columns includes payment device identifiers or virtual access identifiers, one of the columns includes routing numbers, and one of the columns includes primary or real access identifiers associated with the virtual access identifiers. The first authorizing computer 105 may export the table to a file and send the file to the directory service computer 103. Upon receiving the file, the directory service computer 103 may copy the associations stored in the file into memory (e.g., database 103C). In particular, the directory service computer 103 may store associations between issuer accounts and virtual PANs received from different issuers.

At step S102, a user having an issuer account that is not associated with a payment device such as a credit card, may make a request to perform payment transactions through a third party application using the issuer account. The payment request may also be a token request, where the token request requests an access token used in performing the payment transaction. For example, the user of user device 101 may wish to perform a payment transaction using the third party application supported by application computer 102. The user may not have any credit cards or debit cards available for performing the payment transaction. Instead, the user may attempt to perform the transaction by providing information that identifies his/her issuer account. Here, the identifying information may comprise a routing number and an account number associated with the issuer account (e.g., a savings account). The account number may be an example of a primary account identifier. Accordingly, user device 101 may generate a request to perform the payment transaction that includes the routing number and the account number. The user device 101 may transmit the request to application computer 102.

At step S103, upon receiving the request from the user device 101, the application computer 102 may forward account identifying information contained within the request to the directory service computer 103. In some embodiments, upon receiving the request from user device 101 in step S102, application computer 102 may generate a token request that includes the routing number and the account number, as well as an identifier (e.g., a phone number) for the user device 101. The payment token request including the identifying information may be forwarded to the directory service computer 103.

At step S104, upon receiving the payment token request from the application computer 102, the directory service computer 103 may retrieve the virtual access identifier such as the virtual PAN based on information provided in the request, and may forward the PAN to the token service computer 104. For instance, upon receiving the payment token request from the application computer 102, the directory service computer 103 may extract the routing number and the account number from the payment token request and map the combination of the routing number and the account number to a virtual PAN stored in the table. In this particular case, the virtual PAN is an example of a virtual access identifier. The virtual PAN is used, because the user does not have an actual payment device or payment device identifier associated with his/her issuer account. The directory service computer 103 may provide a request to the token service computer 104 to provision an access token such as a payment token to the user device 101 or the application computer 102. In making the request, the directory service computer 103 may send the virtual PAN and a user device identifier such as a phone number, SIM card number, or e-mail address to token service computer 104.

At step S105, upon receiving the access token request, the token service computer 104 may provision an access token such as a payment token to the application computer 102. For example, upon receiving the request containing the virtual PAN from the directory service computer 103, the token service computer 104 may generate or retrieve from memory a payment token based on the virtual PAN. The token service computer 104 may then provision the payment token along with other associated information (e.g., card art, terms and conditions) to the user device 101. In some cases, this may involve sending the payment token to the application computer 102, which may then provide the access token to the user device 101 (step S106). In some cases, the application computer 102 may retain the access token as a credential on file. The user device 101 can access the access token via the application computer 102.

Once the user device 101 has been provisioned with an access token (e.g., payment token), the user device 101 may be used to initiate an action. In some embodiments, the action may be an interaction such as a transaction (e.g., a payment transaction), a request for secure data, a request to access a particular location, etc. This process can be described in greater detail with respect to the flowchart in FIG. 7.

Figure 7:
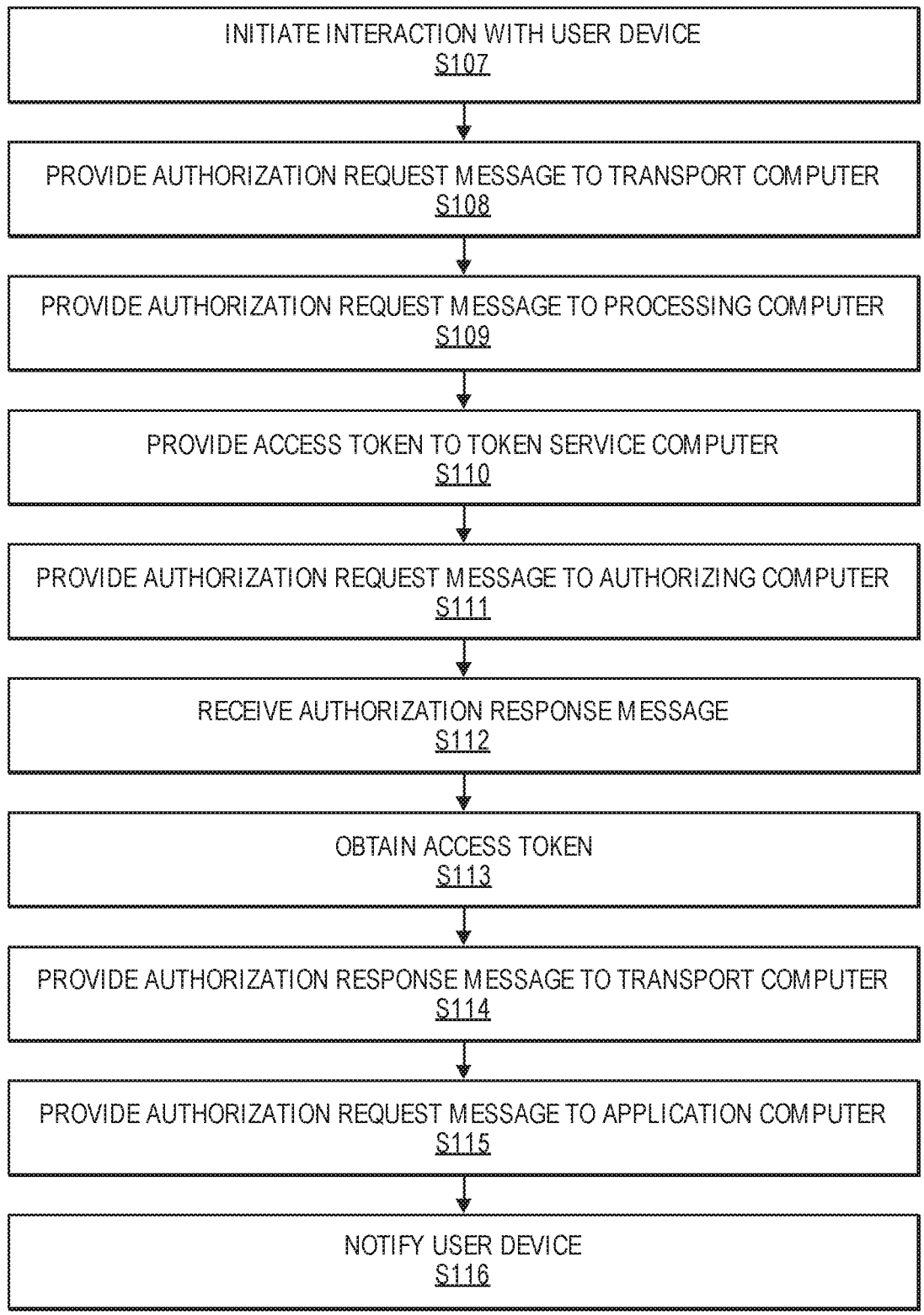
FIG. 7 shows a flowchart illustrating a method for conducting an interaction after the user device or application computer receives the access token.

Referring to FIG. 7, the provisioned payment token may be used to perform the requested payment transaction. In step S107, a user using the user device 101 may initiate an action such as a payment transaction on an application associated with the application computer 102. The user may initiate the application, which may cause the user device 101 to communicate with the application computer 102. The application computer 102 may be, for example, a ride sharing application and the user may wish to pay for a ride using the ride-sharing application.

In step S108, after the user expresses an intent to pay, the application computer 102 may generate an authorization request message comprising the payment token and a transaction amount. The authorization request message may then be transmitted from the application computer 102 to the transport computer 107. In step S109, the transport computer 107 may transmit the authorization request message to the processing computer 108.

In step S110, the processing computer 108 then provide the access token to the token service computer 104. The token service computer 104 may then look up the virtual PAN associated with the access token and may return the virtual PAN associated with the access token to the processing computer 108. The processing computer 108 may then modify the authorization request message with the virtual account number and may forward the authorization request message to the processing computer 108. In other embodiments, the processing computer 108 may simply route the authorization request message with the payment token to the token service computer 104, and then the token service computer 104 may return the authorization request message with the virtual PAN.

In step S111, the processing computer 108 may then transmit the authorization request message including the virtual PAN to the first authorizing computer 105. Upon receiving the authorization request message, the first authorizing computer 105 may map the virtual PAN to the user's issuer account by locating real or primary account number. The first authorizing computer 105 may then debit the issuer account in accordance with the payment transaction. As a result, the user has been issued a digital account (i.e., the virtual PAN) via a third party application in a quick and convenient fashion, where the user may continue to use the association between the digital account and the user's issuer account to make payment transactions through the third party application.

In some embodiments, the authorizing computer 105 may perform one or more risk decision and/or card activation steps to activate the virtual PAN. In alternative embodiments, the virtual PAN may be activated in an earlier step. In some embodiments, even after the virtual PAN is activated, the user may not receive any payment device associated with the virtual PAN or learn of the virtual PAN. The user may not use the virtual PAN to conduct payment transactions with merchants in the traditional sense (e.g., use the virtual PAN to make purchases at brick-and-mortar stores).

After the first authorizing computer 105 has approved of the transaction, the first authorizing computer 105 may generate an authorization response message. The first authorizing computer 105 may then transmit the authorization response message to the processing computer 108 at step S112.

At step S113, after receiving the authorization response message, the processing computer 108 may communicate with the token service computer 104 to exchange the virtual PAN for the payment token. The processing computer 108 may then replace the virtual PAN with the payment token in the authorization response message. At step S114, the processing computer 108 may then transmit the authorization response message to the transport computer 107, and then to the application computer 102 in step S115. At step S116, the application computer 102 may notify the user device 101 that the transaction has been approved.

At the end of the day or at any other suitable period of time a clearing and settlement process may be performed using the issuer account. For example, a settlement or transmission of funds may be facilitated between an acquirer, the payment processing network, and the first authorizing computer 105.

In an alternative embodiment, after allocating virtual PANs for issuer accounts as described in step S101, the first authorizing computer 105 may not send files containing associations between issuer accounts and PANs to the directory service computer 103. Instead, responsive to receiving a payment token request, the directory service computer 103 may query the first authorizing computer 105 for PANs in real-time.

Although the examples above specifically discuss payment transactions, embodiments of the invention are not limited to payment transactions. Other examples of accounts that can be quickly provided via pre-allocation of virtual PANs may include user accounts for online services, emails accounts, corporate accounts, and types of accounts that are often created via third-party applications.

As described, the inventive service may involve implementing one or more functions, processes, operations or method steps. In some embodiments, the functions, processes, operations or method steps may be implemented as a result of the execution of a set of instructions or software code by a suitably-programmed computing device, microprocessor, data processor, or the like. The set of instructions or software code may be stored in a memory or other form of data storage element which is accessed by the computing device, microprocessor, etc. In other embodiments, the functions, processes, operations or method steps may be implemented by firmware or a dedicated processor, integrated circuit, etc.

Any of the software components or functions described in this application may be implemented as software code to be executed by a processor using any suitable computer language such as, for example, Java, C++ or Perl using, for example, conventional or object-oriented techniques. The software code may be stored as a series of instructions, or commands on a computer-readable medium, such as a random access memory (RAM), a read-only memory (ROM), a magnetic medium such as a hard-drive or a floppy disk, or an optical medium such as a CD-ROM. Any such computer-readable medium may reside on or within a single computational apparatus, and may be present on or within different computational apparatuses within a system or network.

While certain exemplary embodiments have been described in detail and shown in the accompanying drawings, it is to be understood that such embodiments are merely illustrative of and not intended to be restrictive of the broad invention, and that this invention is not to be limited to the specific arrangements and constructions shown and described, since various other modifications may occur to those with ordinary skill in the art.

As used herein, the use of "a", "an" or "the" is intended to mean "at least one", unless specifically indicated to the contrary.

What is claimed is:

1. A method comprising:
    receiving, by a directory service computer from an application on a user device, a request to provide an access token that is associated with a primary access identifier for an account, the request comprising identifying information that identifies the account, the identifying information including one or more of mobile device identification information, a digital wallet identifier, or information identifying a token service computer;
    retrieving, by the directory service computer, a virtual access identifier based on the identifying information; and
    transmitting a request, by the directory service computer to the token service computer, that the access token be provisioned, wherein the request comprises the virtual access identifier, and the token service computer thereafter:
        receives the request for the access token;
        determines the access token associated with the virtual access identifier; and
        provisions the user device or an application computer associated with the user device with the access token.

2. The method of claim 1, further comprising:
    receiving, by the token service computer, the access token, the access token being present in an authorization request message;

determining, by the token service computer, the virtual access identifier associated with the access token; and transmitting, by a processing computer, the authorization request message comprising the virtual access identifier to an authorizing computer for authorization, the authorizing computer determining the primary access identifier using the virtual access identifier and performing an action with the primary access identifier.

3. The method of claim 2, further comprising:

receiving, by the directory service computer from the authorizing computer, a file including a plurality of virtual access identifiers and primary access identifiers, the virtual access identifiers not being capable of being used with resource provider computers to conduct transactions.

4. The method of claim 1 wherein receiving, by the directory service computer from the application on the user device, the request to provide the access token occurs via the application computer associated with the application.

5. The method of claim 2, wherein the authorization request message is received by the token service computer from the application computer via a transport computer.

6. The method of claim 1, wherein the user device is a mobile phone.

7. The method of claim 1, wherein the access token provides access to secure data.

8. A system comprising:

a directory service computer, the directory service computer comprising a data processor, and a computer readable medium, the computer readable medium comprising code, executable by the data processor, to cause the directory service computer to:

receive from an application on a user device, a request to provide an access token that is associated with a primary access identifier for an account, the request comprising identifying information that identifies the account, the identifying information including one or more of mobile device identification information, a digital wallet identifier, or information identifying a token service computer;

retrieve a virtual access identifier based on the identifying information, and transmit a request, by the directory service computer to the token service computer, that the access token be provisioned, wherein the request comprises the virtual access identifier, and the token service computer thereafter;

receives the request for the token;

determines the access token associated with the virtual access identifier; and provisions the user device or an application computer associated with the user device with the access token.

9. The system of claim 8, wherein the data processor is a first data processor and the computer readable medium is a first computer readable medium, and wherein the system further comprises:

the token service computer in communication with the directory service computer, the token service computer comprising a second data processor and a second computer readable medium coupled to the second data processor, the second computer readable medium comprising code, executable by the second data processor to cause the token service computer to: receive the access token, the access token being present in an authorization request message, and determine the virtual access identifier associated with the access token; and a processing computer comprising a third data processor and a third computer readable medium coupled to the third data processor, the third computer readable medium comprising code, executable by the third data processor to cause the processing computer to transmit the authorization request message comprising the virtual access identifier to an authorizing computer for authorization, the authorizing computer determining the primary access identifier using the virtual access identifier and performing an action with the primary access identifier.

10. The system of claim 9, wherein the computer readable medium of the directory service computer further comprises code, executable by the first data processor to cause the directory service computer to receive from the authorizing computer, a file including a plurality of virtual access identifiers and real access identifiers, the virtual access identifiers not being capable of being used with resource provider computers to conduct transactions.

11. The system of claim 8, wherein code for causing the directory service computer to receive from the application on the user device, the request to provide the access token occurs via the application computer associated with the application.

12. The system of claim 8, wherein the access token provides access to secure data.

13. A method comprising:

receiving, by a token service computer and from a directory service computer, a virtual access identifier and a request to provision a user device or an application computer associated with the user device with an access token, the directory service computer retrieving the virtual access identifier based on identifying information included in the request, the identifying information including one or more of mobile device identification information, a digital wallet identifier, or information identifying the token service computer;

transmitting, by the token service computer, the access token to the user device or the application computer associated with the user device;

receiving, by the token service computer, the access token, the access token being in an authorization request message;

determining, by the token service computer, the virtual access identifier using the access token; and providing, by the token service computer, the virtual access identifier to a processing computer, the processing computer transmitting an authorization request message comprising the virtual access identifier to an authorizing computer for authorization, the authorizing computer using the virtual access identifier to determine a primary access identifier.

14. The method of claim 13, wherein the user device is a mobile phone.

15. The method of claim 13, wherein the authorization request message is received from the application computer associated with an application on the user device.

16. The method of claim 13, wherein the authorizing computer uses the primary access identifier to perform an action.

17. The method of claim 13, wherein the authorizing computer uses the primary access identifier to perform an action, the action being allowing access to secure data by the user device.

18. The method of claim 13, wherein the token service computer and the processing computer are part of a same system.

\* \* \* \* \*